United States Patent
Shkedi et al.

(10) Patent No.: US 11,282,105 B1
(45) Date of Patent: Mar. 22, 2022

(54) ANONYMIZED CROSS-APPLICATION OR CROSS-SITE ATTRIBUTION WITHOUT USE OF CENTRAL IDS

(71) Applicant: ALMONDNET INC., Long Island City, NY (US)

(72) Inventors: Roy Shkedi, Forest Hill, NY (US); Noam Ben Ishay, Tzur Yigal (IL)

(73) Assignee: ALMONDNET INC., Long Island City (*) Notice: Subject to any disclaimer, the term of this patent is extended or adjusted under 35 U.S.C. 154(b) by 0 days.

(21) Appl. No.: 17/395,214

(22) Filed: Aug. 5, 2021

Related U.S. Application Data

(60) Provisional application No. 63/072,783, filed on Aug. 31, 2020, provisional application No. 63/072,055, filed on Aug. 28, 2020.

(51) Int. Cl.
  *G06Q 30/02* (2012.01)
(52) U.S. Cl.
  CPC ..... *G06Q 30/0242* (2013.01); *G06Q 30/0277* (2013.01)
(58) Field of Classification Search
  CPC .................. G06Q 30/0242; G06Q 30/0277
  See application file for complete search history.

(56) References Cited

U.S. PATENT DOCUMENTS

| | | | | |
|---|---|---|---|---|
| 8,032,556 B1* | 10/2011 | Cook | ................. | G06F 16/957 707/783 |
| 9,432,460 B2 | 8/2016 | Peters et al. | | |
| 10,091,312 B1* | 10/2018 | Khanwalkar | ........... | H04L 67/22 |
| 2011/0137975 A1* | 6/2011 | Das | .................... | G06Q 30/0269 709/203 |
| 2011/0167471 A1* | 7/2011 | Riley | ...................... | H04W 4/00 726/1 |
| 2012/0203639 A1* | 8/2012 | Webster | ................ | H04L 67/025 705/14.66 |
| 2012/0303447 A1 | 11/2012 | Hughes et al. | | |

(Continued)

OTHER PUBLICATIONS

"CCPA Regulations" (Aug. 14, 2020) Available at https://oag.ca.gov/privacy/ccpa/regs (Year: 2020).*

(Continued)

*Primary Examiner* — Eric R Netzloff
(74) *Attorney, Agent, or Firm* — Panitch Schwarze Belisario & Nadel LLP

(57) ABSTRACT

Systems and methods are described for attributing online actions to previously delivered electronic advertisements on a plurality of devices using a plurality of device identifier (ID) clusters without use of central IDs. Each device ID cluster is associated with a device, and each device has device characteristics. Each device ID cluster includes one or more device identifiers. Device-related ad impression data and online action data is received. This data includes a device identifier associated with the device. The device identifier is used to identify the device ID cluster associated with the device to which the ad impression was delivered or the online action took place on. Copy devices are selected and paired with respective devices, and the same ad impression data or online action data are assigned to respective copy devices, thereby anonymizing the devices for which the device-related ad impression data or online action data was received.

27 Claims, 38 Drawing Sheets

(56) References Cited

U.S. PATENT DOCUMENTS

| | | | | |
|---|---|---|---|---|
| 2014/0372224 | A1* | 12/2014 | Tawakol | H04L 29/0809 705/14.66 |
| 2015/0324844 | A1 | 11/2015 | Wang et al. | |
| 2016/0127289 | A1* | 5/2016 | Papa | H04L 51/12 709/206 |
| 2016/0142379 | A1* | 5/2016 | Tawakol | G06F 21/6263 726/1 |
| 2016/0267540 | A1* | 9/2016 | Garcia | G06Q 30/0267 |
| 2017/0154356 | A1 | 6/2017 | Trevisiol et al. | |
| 2017/0364966 | A1* | 12/2017 | Yamada | G06Q 30/0269 |
| 2019/0228171 | A1* | 7/2019 | Mathur | G06F 16/242 |
| 2020/0336313 | A1* | 10/2020 | Knox | G06Q 30/0277 |
| 2021/0099431 | A1* | 4/2021 | Wasicek | H04L 63/0428 |
| 2021/0103449 | A1* | 4/2021 | Terpstra | G06F 21/44 |
| 2021/0133490 | A1* | 5/2021 | Harris | G06K 9/6263 |
| 2021/0211403 | A1* | 7/2021 | Robinson | H04L 67/2823 |
| 2021/0286899 | A1* | 9/2021 | Schroeder | G06F 21/645 |
| 2021/0320914 | A1* | 10/2021 | Pillai | G06F 21/45 |

OTHER PUBLICATIONS

European Union Agency for Cybersecurity, "Pseudonymisation techniques and best practices". (2019) available at: https://www.enisa.europa.eu/publications/pseudonymisation-techniques-and-best-practices: (Year: 2019).*

Press News Agency, "What's Up with the Apple App Store's Privacy Changes?". (Mar. 16, 2021 08:00 ET), available at https://pressnewsagency.org/whats-up-with-the-apple-app-stores-privacy-changes/: (Year: 2021).*

Shuptine, Chris, "The 2020 Guide to Google Analytics and GDPR Compliance" Dec. 6, 2019, available at: https://www.kevel.co/blog/gdpr-google-analytics/ (Year: 2020).*

"Complete guide to GDPR compliance" (2021), Available at https://gdpr.eu/ (Year: 2021).*

Provide information for Google Play's Data safety section:, (2021) Available at: https://support.google.com/googleplay/android-developer/answer/10787469?hl=en (Year: 2021).*

"App privacy details on the App Store", (2021) Available at: https://developer.apple.com/app-store/app-privacy-details/ (Year: 2021).*

Bhaskar Chakravorti, "Why It's So Hard for Users to Control Their Data", (Jan. 30, 2020), Available at: https://hbr.org/2020/01/why-companies-make-it-so-hard-for-users-to-control-their-data (Year: 2020).*

Ulf Mattsson, "Practical Data Security and Privacy for GDPR and CCPA" (May 13, 2020), Available at: https://www.isaca.org/resources/isaca-journal/issues/2020/volume-3/practical-data-security-and-privacy-for-gdpr-and-ccpa (Year: 2020).*

Clark, Kendra, "Apple allowing Meta & Snap to skirt privacy restrictions? The industry reacts" Dec. 9, 2021, available at: https://www.thedrum.com/news/2021/12/09/apple-allowing-meta-snap-skirt-privacy-restrictions-the-industry-reacts (Year: 2021).*

International Search Report and Written Opinion dated Nov. 4, 2021 in International Application No. PCT/US2021/046299.

* cited by examiner

Figure 2B

| | A | B | C | D | E | F | G | H |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | To Fig. 2C |
| 7 | | | | | | | | |
| 8 | | | | | | | | |
| 9 | Original | Imp. | Total imp. # | Action | Total # of actions | Associated | Association | copied |
| 10 | device # | (1-yes; 0-no) | per device | (1-yes; 0-no) | per device | device | level | device # |
| 11 | | | | | | | | |
| 12 | 1 | 1 | 1 | 1 | 0 | | | 101 |
| 13 | 2 | 1 | 1 | 1 | 0 | | | 102 |
| 14 | 3 | 1 | 1 | 1 | 0 | | | 103 |
| 15 | 1 | 1 | 1 | 2 | 0 | | | 101 |
| 16 | 4 | 1 | 1 | 1 | 0 | | | 104 |
| 17 | 5 | 1 | 1 | 1 | 0 | | | 105 |
| 18 | 2 | 1 | 1 | 2 | 0 | | | 102 |
| 19 | 1 | 1 | 1 | 3 | 0 | | | 101 |

To Fig. 2D

|   | I | J | K | L | M | N | O |
|---|---|---|---|---|---|---|---|
| 1 |   |   |   |   |   |   |   |
| 2 |   |   |   |   |   |   |   |
| 3 |   |   |   |   |   |   |   |
| 4 |   |   |   |   |   |   |   |
| 5 |   |   |   |   |   |   |   |
| 6 |   |   | action or/and imp. on different |   |   |   |   |
| 7 |   |   |   |   |   |   |   |
| 8 | Made-up # of | Made-up # of | device | Made-up # of | Made-up # of |   |   |
| 9 | imp. on | actions on | copied | imp. on | actions on | Associated | Association |
| 10 | copied device | copied device | device # | copied device | copied device | device | level |
| 11 |   |   |   |   |   |   |   |
| 12 | 1 | 1 | 0 |   |   |   |   |
| 13 | 1 | 1 | 0 |   |   |   |   |
| 14 | 1 | 1 | 0 |   |   |   |   |
| 15 | 2 |   | 0 |   |   |   |   |
| 16 | 1 | 1 | 0 |   |   |   |   |
| 17 |   | 1 | 0 |   |   |   |   |
| 18 | 2 |   | 0 |   |   |   |   |
| 19 | 3 |   | 0 |   |   |   |   |

|    | A | B | C | D | E | F | G | H |
|----|---|---|---|---|---|---|---|---|
| 20 |   |   |   |   |   |   |   |   |
| 21 | 6 | 0 | 0 | 1 | 1 |   |   | 106 |
| 22 | 2 | 0 | 2 | 1 | 1 |   |   | 102 |
| 23 | 3 | 0 | 1 | 1 | 1 |   |   | 103 |
| 24 | 2 | 0 | 2 | 1 | 2 |   |   | 102 |
| 25 | 7 | 0 | 0 | 1 | 1 | 4 | Person | 107 |
| 26 | 4 | 1 | 2 | 0 | 0 | 7 | Person | 108 |
| 27 |   |   |   |   |   |   |   |   |
| 28 |   |   |   |   |   |   |   |   |
| 29 |   |   |   |   |   |   |   |   |
| 30 |   |   |   |   |   |   |   |   |
| 31 |   |   |   |   |   |   |   |   |
| 32 |   |   | ATTRIBUTION CALCULATION |   |   |   |   |   |
| 33 |   |   |   |   |   |   |   |   |
| 34 |   |   |   |   |   |   |   |   |
| 35 |   | Total imp. # |   | Total # of actions | Original devices |   |   |   |
| 36 |   | on original devices |   | on original devices | Attribution ratio |   |   |   |
| 37 |   |   |   |   |   |   |   |   |
| 38 |   | 9 |   | 5 | 55.6% |   |   |   |

| | I | J | K | L | M | N | O |
|---|---|---|---|---|---|---|---|
| 20 | | | | | | | |
| 21 | 0 | 1 | | | | | |
| 22 | 2 | 1 | | | | | |
| 23 | 1 | 1 | | | | | |
| 24 | 2 | 2 | | | | | |
| 25 | 0 | 1 | 108 | 1 | 0 | 107 | Person |
| 26 | 2 | 0 | | | | | |
| 27 | | | | | | | |
| 28 | | | | | | | |
| 29 | | | | | | | |
| 30 | | | | | | | |
| 31 | | | | | | | |
| 32 | Total # of | Total # of | | | Total # of | Total # of actions | Attribution ratio seen by CS that cannot distinguish between original & copy devices |
| 33 | made-up | made-up | | | imp. on original | on original | |
| 34 | imp. on | actions on | Copy devices | | & copy devices | & copy devices | |
| 35 | copied devices | copied devices | Attribution ratio | | | | |
| 36 | | | | | | | |
| 37 | 9 | 5 | 55.56% | | 18 | 10 | 55.56% |

Cross App Attribution 1st example — copy device identified on next impression or action on original device (showing equations)

| Figure 3B | Figure 3C | Figure 3D |
|---|---|---|
| Figure 3E | Figure 3F | Figure 3G |

*Figure 3A*

|  | A | B | C | D | E | F |
|---|---|---|---|---|---|---|
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | Original | Imp. | Total imp. # | Action | Total # of actions | Associated |
| 10 | device # | (1-yes; 0-no) | per device | (1-yes; 0-no) | per device | device |
| 11 | | | | | | |
| 12 | 1 | 1 | 1 | 0 | | |
| 13 | 2 | 1 | 1 | 0 | | |
| 14 | 3 | 1 | 1 | 0 | | |
| 15 | 1 | 1 | =B12+B15 | 0 | 0 | |
| 16 | 4 | 1 | 1 | 0 | 0 | |
| 17 | 5 | 1 | 1 | 0 | 0 | |
| 18 | 2 | 1 | =B13+B18 | 0 | 0 | |
| 19 | 1 | 1 | =B12+B15+B19 | 0 | 0 | |

| | G | H | I | J |
|---|---|---|---|---|
| 1 | | | | |
| 2 | | | | |
| 3 | | | | |
| 4 | | | | |
| 5 | | | | |
| 6 | | | | |
| 7 | | | | |
| 8 | Association | copied | Made-up # of imp. on copied device | Made-up # of actions on copied device |
| 9 | level | device # | | |
| 10 | | | | |
| 11 | | | | |
| 12 | | 101 | =C12 | 0 |
| 13 | | 102 | =C13 | 0 |
| 14 | | 103 | =C14 | 0 |
| 15 | | 101 | =C15 | 0 |
| 16 | | 104 | =C16 | 0 |
| 17 | | 105 | =C17 | 0 |
| 18 | | 102 | =C18 | 0 |
| 19 | | 101 | =C19 | 0 |

*Figure 3C*

| | K | L | M | N | O |
|---|---|---|---|---|---|
| 1 | | | | | |
| 2 | | | | | |
| 3 | | | | | |
| 4 | | | | | |
| 5 | | | | | |
| 6 | action or/and imp. | | | | |
| 7 | on different | | | | |
| 8 | device | Made-up # of | Made-up # of | | |
| 9 | copied | imp. on | actions on | Associated | Association |
| 10 | device # | copied device | copied device | device | level |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |

|    | A | B | C | D | E | F |
|----|---|---|---|---|---|---|
| 20 |   |   |   |   |   |   |
| 21 | 6 | 0 | 0 | 1 | 1 |   |
| 22 | 2 | 0 | =C18 | 1 | 1 |   |
| 23 | 3 | 0 | =C14 | 1 | 1 |   |
| 24 | 2 | 0 | 2 | 1 | 2 |   |
| 25 | 7 | 0 | 0 | 1 | 1 |   |
| 26 | 4 | 1 | =1+C16 | =0+D16 | =D26+E16 | 4 |
| 27 |   |   |   |   |   | 7 |
| 28 |   |   |   |   |   |   |
| 29 |   |   |   |   |   |   |
| 30 |   |   |   |   |   |   |
| 31 |   |   | ATTRIBUTION CALCULATION |   |   |   |
| 32 |   |   |   |   |   |   |
| 33 |   |   |   |   |   |   |
| 34 |   |   |   |   |   |   |
| 35 |   | Total imp. # | | Total # of actions | Original devices |   |
| 36 |   | on original devices | | on original devices | Attribution ratio |   |
| 37 |   |   |   |   |   |   |
| 38 |   | =SUM(B12:B30) | | =SUM(D12:D30) | =D38/B38 |   |

| | G | H | I | J |
|---|---|---|---|---|
| 20 | | | | |
| 21 | | 106 | =C21 | 1 |
| 22 | | 102 | =C22 | =E22 |
| 23 | | 103 | =C23 | =E23 |
| 24 | | 102 | =C24 | =E24 |
| 25 | Person | 107 | =+C25 | =+E25 |
| 26 | Person | 108 | =C26 | =E26 |
| 27 | | | | |
| 28 | | | | |
| 29 | | | | |
| 30 | | | | |
| 31 | | | | |
| 32 | | | | |
| 33 | | | Total # of | Total # of |
| 34 | | | made-up | made-up |
| 35 | | | imp on | actions on |
| 36 | | | copied devices | copied devices |
| 37 | | | | |
| 38 | | | =I26+I25+I24+I23+I21+I19+I17 | =J26+J25+J24+J23+J21+J19+J17 |

| | K | L | M | N | O |
|---|---|---|---|---|---|
| 20 | | | | | |
| 21 | | | | | |
| 22 | | | | | |
| 23 | | | | | |
| 24 | | | | | |
| 25 | 108 | =+C16 | =+E16 | 107 | Person |
| 26 | | | | | |
| 27 | | | | | |
| 28 | | | | | |
| 29 | | | | | |
| 30 | | | | | |
| 31 | | | | | |
| 32 | | | | | |
| 33 | | | | | |
| 34 | | | Total # of imp. on original & copy devices | Total # of actions on original & copy devices | Attribution ratio seen by CS that cannot distinguish between original & copy devices |
| 35 | Copy devices | | | | |
| 36 | Attribution ratio | | | | |
| 37 | | | | | |
| 38 | =J38/J38 | | =B38+I38 | =D38+J38 | =N38/M38 |

| Figure 4B | Figure 4C | Figure 4D | Figure 4E | Figure 4F |
|---|---|---|---|---|
| Figure 4G | Figure 4H | Figure 4I | Figure 4J | Figure 4K |

Cross App Attribution 2nd example – using Removal_Table (showing equations)

*Figure 4A*

|   | A | B | C | D | E | F |
|---|---|---|---|---|---|---|
| 1 |   |   |   |   |   |   |
| 2 |   |   |   |   |   |   |
| 3 |   |   |   |   |   |   |
| 4 |   |   |   |   |   |   |
| 5 |   |   |   |   |   |   |
| 6 | Original | Imp. | Total imp. # | Action | Total # of actions | Associated |
| 7 | device # | (1-yes; 0-no) | per device | (1-yes; 0-no) | per device | device |
| 8 |   |   |   |   |   |   |
| 9 | 1 | 1 | 1 | 0 | 0 |   |
| 10 | 2 | 1 | 1 | 0 | 0 |   |
| 11 | 3 | 1 | 1 | 0 | 0 |   |
| 12 | 1 | 1 | =B9+B12 | 0 | 0 |   |
| 13 | 4 | 1 | 1 | 0 | 0 |   |
| 14 | 5 | 1 | 1 | 0 | 0 |   |
| 15 | 2 | 1 | =B10+B15 | 0 | 0 |   |
| 16 | 1 | 1 | =B9+B12+B16 | 0 | 0 |   |
| 17 |   |   |   |   |   |   |
| 18 | 6 | 0 | 0 | 1 | 1 |   |

|   | G | H | I | J |
|---|---|---|---|---|
|   | Association level | copied device # | Made-up # of imp. on copied device | Made-up # of actions on copied device |
| 1 |   |   |   |   |
| 2 |   |   |   |   |
| 3 |   |   |   |   |
| 4 |   |   |   |   |
| 5 |   |   |   |   |
| 6 |   |   |   |   |
| 7 |   |   |   |   |
| 8 |   |   |   |   |
| 9 |   | 101 | =C9 | 0 |
| 10 |   | 102 | =C10 | 0 |
| 11 |   | 103 | =C11 | 0 |
| 12 |   | 104 | =C12 | 0 |
| 13 |   | 105 | =C13 | 0 |
| 14 |   | 106 | =C14 | 0 |
| 15 |   | 107 | =C15 | 0 |
| 16 |   | 108 | =C16 | 0 |
| 17 |   |   |   |   |
| 18 |   | 109 | =C18 | 1 |

*Figure 4C*

| | K | L | M | N | O | P |
|---|---|---|---|---|---|---|
| 1 | | | | | | |
| 2 | | | | | | |
| 3 | action or/and imp. | | | | | |
| 4 | on different | | | | | |
| 5 | device | Made-up # of | Made-up # of | Associated | Association | Total number |
| 6 | copied | imp on | actions on | device | level | of devices |
| 7 | device # | copied device | copied device | | | |
| 8 | | | | | | |
| 9 | | | | | | 2 |
| 10 | | | | | | 4 |
| 11 | | | | | | 6 |
| 12 | | | | | | 7 |
| 13 | | | | | | 9 |
| 14 | | | | | | 11 |
| 15 | | | | | | 12 |
| 16 | | | | | | 13 |
| 17 | | | | | | |
| 18 | | | | | | 15 |

*Figure 4D*

|   | Q | R | S | T |
|---|---|---|---|---|
| 1 | | | | REMOVAL TABLE |
| 2 | | | | |
| 3 | | | | |
| 4 | | | | |
| 5 | | | | |
| 6 | Total number of imp. | Total number of actions | | Total imp. # per 1st device |
| 7 | | | | |
| 8 | | | | |
| 9 | =B9+I9 | =D9+J9 | | |
| 10 | =Q9+B10+I10 | =R9+D10+J10 | | |
| 11 | =Q10+B11+I11 | =R10+D11+J11 | | |
| 12 | =Q11+B12+I12 | =R11+D12+J12 | >> | 1 |
| 13 | =Q12+B13+I13 | =R12+D13+J13 | | |
| 14 | =Q13+B14+I14 | =R13+D14+J14 | | |
| 15 | =Q14+B15+I15 | =R14+D15+J15 | >> | 1 |
| 16 | =Q15+B16+I16 | =R15+D16+J16 | >> | 2 |
| 17 | | | | |
| 18 | =Q16+B18+I18 | =R16+D18+J18 | | |

*Figure 4E*

| | U | V | W | X |
|---|---|---|---|---|
| 1 | | | | |
| 2 | | | | |
| 3 | | | | |
| 4 | | | | |
| 5 | | | | |
| 6 | Total # of actions per 1st device | Total imp. # per 2nd device | Total # of actions per 2nd device | 1st & 2nd devices association level |
| 7 | | | | |
| 8 | | | | |
| 9 | | | | |
| 10 | | | | |
| 11 | | | | |
| 12 | 0 | | | |
| 13 | | | | |
| 14 | | | | |
| 15 | 0 | | | |
| 16 | 0 | | | |
| 17 | | | | |
| 18 | | | | |

|    | A | B | C | D | E | F |
|----|---|---|-----|------|---------|---|
| 19 | 2 | 0 | =C15 | 1 | 1 | |
| 20 | 3 | 0 | =C11 | 1 | 1 | |
| 21 | 2 | 0 | 2 | 1 | 2 | |
| 22 | 7 | 0 | 0 | 1 | 1 | 4 |
| 23 | 4 | 1 | =1+C13 | =0+D13 | =D23+E13 | 7 |
| 24 | | | | | | |
| 25 | | | | | | |
| 26 | | | | | | |
| 27 | | | | | | |
| 28 | | | | | | |
| 29 | ATTRIBUTION CALCULATION | | | | | |
| 30 | | | | | | |
| 31 | | | | | | |
| 32 | | Total imp. # on | | Total # of actions | Original devices | |
| 33 | | original devices | | on original devices | Attribution ratio | |
| 34 | | | | | | |
| 35 | | =SUM(B9:B27) | | =SUM(D9:D27) | =D35/B35 | |

*Figure 4G*

| | G | H | I | J |
|---|---|---|---|---|
| 19 | | 110 | =C19 | =E19 |
| 20 | | 111 | =C20 | =E20 |
| 21 | | 112 | =C21 | =E21 |
| 22 | Person | 113 | =+C13 | =+E13 |
| 23 | Person | 115 | =C23 | =E23 |
| 24 | | | | |
| 25 | | | | |
| 26 | | | | |
| 27 | | | | |
| 28 | | | | |
| 29 | | | | |
| 30 | | | Total # of | Total # of |
| 31 | | | made-up | made-up |
| 32 | | | imp. on | actions on |
| 33 | | | copied devices | copied devices |
| 34 | | | | |
| 35 | | | =SUM(I9:I27)+SUM(L9:L27) | =SUM(J9:J27)+SUM(M9:M27) |

| | K | L | M | N | O | P |
|---|---|---|---|---|---|---|
| 19 | | | | | | |
| 20 | | | | | | |
| 21 | | | | | | 16 |
| 22 | 114 | =+C22 | =+E22 | | | 17 |
| 23 | 116 | =C22 | =E22 | | | 18 |
| 24 | | | | | | |
| 25 | | | | 113 | Person | 21 |
| 26 | | | | 115 | Person | 23 |
| 27 | | | | | | |
| 28 | | | | | | |
| 29 | | | | | | |
| 30 | | | | | | |
| 31 | | | | | | |
| 32 | | | | | | |
| 33 | | | | | | |
| 34 | | | | | | |
| 35 | | | | | | |

*Figure 4I*

| | Q | R | S | T |
|---|---|---|---|---|
| 19 | =Q18+B19+I19 | =R18+D19+J19 | >> | 2 |
| 20 | =Q19+B20+I20 | =R19+D20+J20 | >> | 1 |
| 21 | =Q20+B21+I21 | =R20+D21+J21 | >> | 2 |
| 22 | =Q21+B22+I22+L22 | =R21+D22+J22+M22 | >> | 1 |
| 23 | =Q22+B23+I23+L23 | =R22+D23+J23+M23 | >> | 1 |
| 24 | | | | |
| 25 | | | | |
| 26 | | | | |
| 27 | | | | Total: =SUM(T12:T27)+SUM(V12:V27) |
| 28 | | | | AFTER REMOVAL |
| 29 | | | | |
| 30 | | | | |
| 31 | Total number of imp. | Total number of actions | | Total number of imp. |
| 32 | | | | |
| 33 | =B35+I35 | =D35+J35 | | =Q35-T28 |
| 34 | | | | |
| 35 | | | | =Q35-T28 |

*Figure 4J*

| | U | V | W | X |
|---|---|---|---|---|
| 19 | 0 | | | |
| 20 | 0 | | | |
| 21 | 1 | | | Person |
| 22 | 0 | | | |
| 23 | 0 | 0 | 1 | |
| 24 | | | | |
| 25 | | | | |
| 26 | | | | |
| 27 | =SUM(U12:U27)+SUM(W12:W2) | | | |
| 28 | | | | |
| 29 | | Total number of actions | Total devices (original + copy) | |
| 30 | | | | |
| 31 | | | | |
| 32 | | | | |
| 33 | | | Attribution ratio | |
| 34 | | | | |
| 35 | =R35-U28 | =U35/T35 | | |

*Figure 4K*

Cross App Attribution 2nd example – using Removal_Table

| Figure 5B | Figure 5C | Figure 5D | Figure 5E |
| Figure 5F | Figure 5G | Figure 5H | Figure 5I |

*Figure 5A*

|   | A | B | C | D | E | F |
|---|---|---|---|---|---|---|
| 1 |   |   |   |   |   |   |
| 2 |   |   |   |   |   |   |
| 3 |   |   |   |   |   |   |
| 4 |   |   |   |   |   |   |
| 5 |   |   |   |   |   |   |
| 6 | Original | Imp. | Total imp. # | Action | Total # of actions | Associated |
| 7 | device # | (1-yes, 0-no) | per device | (1-yes, 0-no) | per device | device |
| 8 |   |   |   |   |   |   |
| 9 | 1 | 1 | 1 | 0 | 0 |   |
| 10 | 2 | 1 | 1 | 0 | 0 |   |
| 11 | 3 | 1 | 1 | 0 | 0 |   |
| 12 | 1 | 1 | 2 | 0 | 0 |   |
| 13 | 4 | 1 | 1 | 0 | 0 |   |
| 14 | 5 | 1 | 1 | 0 | 0 |   |
| 15 | 2 | 1 | 2 | 0 | 0 |   |
| 16 | 1 | 1 | 3 | 0 | 0 |   |
| 17 |   |   |   |   |   |   |
| 18 | 6 | 0 | 0 | 1 | 1 |   |

*Figure 5B*

|   | G | H | I | J | K | L |
|---|---|---|---|---|---|---|
| 1 |   |   |   |   |   |   |
| 2 |   |   |   |   |   |   |
| 3 |   |   |   |   |   |   |
| 4 |   |   |   |   |   |   |
| 5 |   |   |   |   | action or/and imp. on different | |
| 6 | Association | copied device # | Made-up # of imp. on copied device | Made-up # of actions on copied device | device copied device # | Made-up # of imp. on copied device |
| 7 | level |   |   |   |   |   |
| 8 |   |   |   |   |   |   |
| 9 |   | 101 | 1 | 0 |   |   |
| 10 |   | 102 | 1 | 0 |   |   |
| 11 |   | 103 | 1 | 0 |   |   |
| 12 |   | 104 | 2 | 0 |   |   |
| 13 |   | 105 | 1 | 0 |   |   |
| 14 |   | 106 | 1 | 0 |   |   |
| 15 |   | 107 | 2 | 0 |   |   |
| 16 |   | 108 | 3 | 0 |   |   |
| 17 |   |   |   |   |   |   |
| 18 |   | 109 | 0 | 1 |   |   |

*Figure 5C*

| | M | N | O | P | Q | R |
|---|---|---|---|---|---|---|
| 1 | | | | | | |
| 2 | | | | | | |
| 3 | | | | | | |
| 4 | | | | | | |
| 5 | Made-up # of actions on copied device | Associated device | Association level | Total number of devices | Total number of imp. | Total number of actions |
| 6 | | | | | | |
| 7 | | | | | | |
| 8 | | | | | | |
| 9 | | | | 2 | 2 | 0 |
| 10 | | | | 4 | 4 | 0 |
| 11 | | | | 6 | 6 | 0 |
| 12 | | | | 7 | 9 | 0 |
| 13 | | | | 9 | 11 | 0 |
| 14 | | | | 11 | 13 | 0 |
| 15 | | | | 12 | 16 | 0 |
| 16 | | | | 13 | 20 | 0 |
| 17 | | | | | | |
| 18 | | | | 15 | 20 | 2 |

*Figure 5D*

| | S | T | U | V | W | X |
|---|---|---|---|---|---|---|
| 1 | | REMOVAL TABLE | | | | |
| 2 | | | | | | |
| 3 | | | | | | |
| 4 | | | | | | |
| 5 | | Total imp. # per 1st device | Total # of actions per 1st device | Total imp. # per 2nd device | Total # of actions per 2nd device | 1st & 2nd devices association level |
| 6 | | | | | | |
| 7 | | | | | | |
| 8 | | | | | | |
| 9 | | | | | | |
| 10 | | | | | | |
| 11 | >> | 1 | 0 | | | |
| 12 | | | | | | |
| 13 | | | | | | |
| 14 | >> | 1 | 0 | | | |
| 15 | >> | 2 | 0 | | | |
| 16 | | | | | | |
| 17 | | | | | | |

*Figure 5E*

|    | A | B | C | D | E | F |
|----|---|---|---|---|---|---|
| 19 | 2 | 0 | 2 | 1 | 1 |   |
| 20 | 3 | 0 | 1 | 1 | 1 |   |
| 21 | 2 | 0 | 2 | 1 | 2 |   |
| 22 | 7 | 0 | 0 | 1 | 1 | 4 |
| 23 | 4 | 1 | 2 | 0 | 0 | 7 |
| 24 |   |   |   |   |   |   |
| 25 |   |   |   |   |   |   |
| 26 |   |   |   |   |   |   |
| 27 |   |   |   |   |   |   |
| 28 |   |   |   |   |   |   |
| 29 | ATTRIBUTION CALCULATION |
| 30 |   |   |   |   |   |   |
| 31 |   |   |   |   |   |   |
| 32 |   | Total imp. # on original devices |   | Total # of actions on original devices | Original devices |   |
| 33 |   |   |   |   | Attribution ratio |   |
| 34 |   |   |   |   |   |   |
| 35 |   | 9 |   | 5 | 55.6% |   |

*Figure 5F*

| | G | H | I | J | K | L |
|---|---|---|---|---|---|---|
| 19 | | 110 | 2 | 1 | | |
| 20 | | 111 | 1 | 1 | | |
| 21 | | 112 | 2 | 2 | | |
| 22 | Person | 113 | 1 | 0 | 114 | 0 |
| 23 | Person | 115 | 2 | 0 | 116 | 0 |
| 24 | | | | | | |
| 25 | | | | | | |
| 26 | | | | | | |
| 27 | | | | | | |
| 28 | | | | | | |
| 29 | | | | | | |
| 30 | | | Total # of made-up imp. on copied devices | Total # of made-up actions on copied devices | | |
| 31 | | | | | | |
| 32 | | | | | | |
| 33 | | | | | | |
| 34 | | | 20 | 7 | | |
| 35 | | | | | | |

*Figure 5G*

| | S | T | U | V | W | X |
|---|---|---|---|---|---|---|
| 19 | >> | 2 | 0 | | | |
| 20 | >> | 1 | 0 | | | |
| 21 | >> | 2 | 1 | | | |
| 22 | >> | 1 | 0 | | | |
| 23 | >> | 1 | 0 | 0 | 1 | Person |
| 24 | | | | | | |
| 25 | | | | | | |
| 26 | | | | | | |
| 27 | | | | | | |
| 28 | Total: | 11 | 2 | | | |
| 29 | | | | | | |
| 30 | | AFTER REMOVAL | | | | |
| 31 | | | | Total devices | | |
| 32 | | Total number of imp. | Total number of actions | (original + copy) | | |
| 33 | | | | Attribution ratio | | |
| 34 | | | | | | |
| 35 | | 18 | 10 | 55.6% | | |

700 START

702 — Receive device-related ad impression data and online action data

704 — Store the ad impression data and the online action data in a database

706 — For each device identifier received from the ad impression data or the online action data, identify a device ID cluster from a plurality of device ID clusters that includes the received device identifier, thereby identifying the device that received the ad impression or took the online action 708 — Electronically link in the database the received ad impression data or online action data with the device associated with the identified device ID cluster 710 — Determine for each received ad impression or online action, whether an ad impression or online action previously occurred either (i) on the same device within the same function that is associated with the identified device ID cluster, or (ii) within another function on the same device that is associated with the identified device ID cluster 712 — When no previous ad impression or online action previously occurred on the same device, (i) select a copy device with similar characteristics to the device associated with the identified device ID cluster, (ii) pair the device associated with the identified device ID cluster with the selected copy device, and (iii) add in the database to the selected copy device a copy of the received ad impression data or online action data received for the device associated with the identified device ID cluster; or when a previous ad impression or online action previously occurred on the same device, add a copy of the received ad impression data or online action data to the previously paired copy device 714 — Repeat Steps 702-712 as additional ad impressions and online actions occur over time on a plurality of the devices 716 — Perform attribution by identifying for at least a given advertiser ID which online actions were preceded by delivered ad impressions on the same device within the same function on a device, or within the same device

END

Figure 7

Examples of device identifiers in device ID clusters 604

| type of device identifier | device identifier |
|---|---|
| application user identifier (AppUID) | AppUID YouTube 1234567890<br>AppUID AccuWeather 9876543210<br>⋮ |
| site visitor identifier (SiteVID)<br>(domain +VID) | SiteVID CNN 2345678901<br>Site VID MSN 678901234<br>⋮ |
| IPv6 address | 3002:0bd6:0000:0000:0000:ee00:0033:6778 |
| combination of IPv4 address and user agent | 172.18.254.1;<br>Mozilla/5.0 (Windows NT 10.0; Win64; x64)<br>AppleWebKit/537.36 (KHTML, like Gecko)<br>Chrome/80.0.3987.87 Safari/537.36 |

Figure 8

ANONYMIZED CROSS-APPLICATION OR CROSS-SITE ATTRIBUTION WITHOUT USE OF CENTRAL IDS

CROSS-REFERENCE TO RELATED APPLICATIONS

This application claims priority to U.S. Provisional Patent Application Nos. 63/072,055 filed Aug. 28, 2020, and 63/072,783 filed Aug. 31, 2020, both of which are incorporated by reference herein.

BACKGROUND OF THE INVENTION

Targeted advertising and attribution in the digital world are based on a central ID enabling the identification of a browser user as they move across sites or a mobile device user as they move across mobile apps.

That central ID, such as a third-party cookie on a browser or a MAID (Mobile Advertising ID such as iOS' IDFA or Android's AAID) for mobile apps, enables a web server to identify a browser user as they move across sites or a mobile device user as they move across mobile apps.

Such identification enables the targeting with an ad of a site visitor based on previously visited other sites or a mobile device user using an app with an ad based on previously used different apps on the same device.

Such central identification further enables attributing an online action such as a site visit to an ad previously delivered on another site using the same browser or attributing an app install or app session to an ad previously delivered on another app on the same device. Examples of additional actions related to a site visit, an app usage or both, include interest in a particular product or service, in-app or in-site purchase, subscription, adding a product to a cart or checking out, to name a few.

Different functions on the same device—where each function is identified by its own ID, such as a browser function identified by a third-party cookie for example or apps function identified by a MAID for example—can be identified as sharing the same device, and the IDs identifying those functions can be associated. The association of functions on the same device is an example of device-level association. In other examples, two browsers, such as Chrome and Microsoft Edge®, on the same device can be associated. As a result, cross-function targeting or attribution on the same device can take place. An example is targeting an ad within the ad space of an app based on the previous visit to the advertiser's website using a browser on the same device. In other examples, a conversion on a website where a product was acquired from an ecommerce website can be attributed to an ad from the ecommerce site for the advertised product that was previously delivered within the ad space of an app on the same device.

Devices can be associated on different levels by associating the IDs identifying those devices. As a result, cross-device targeting or attribution can take place.

Device association can include association on a person level, i.e. different devices used by the same person, or association on a household level, i.e. different devices used by different members of the same household, or association on an office level, i.e., different devices used by different members of the same office, or association on a company level, i.e., different devices used by different members of the same company, or association on another level.

An example of cross-device targeting is the targeting of a device with an ad based on an associated device earlier visit to the advertiser's website. An example of cross-device attribution is attributing an action such as a visit to an advertiser's website on a device to a previously delivered ad from that same advertiser on an associated device.

Associating functions on the same device or associating different devices can be achieved using deterministic methods or probabilistic methods or both. Deterministic methods can rely on the collection of Personal Identifiable Information (PII), such as an email address or postal address, person name, company name, GPS coordinates or other, and matching the collected data across different functions of the same device or across devices. Probabilistic methods can rely on a shared IP address, such as a shared LAN or WiFi or sameuser-agent or GPS coordinates, where the location is shared by more than one person or household or apartment or office or other.

Utilizing a central ID, granular attribution is achieved, at any desired level. For example, a central computer system, assembling data from different sites or different apps on same or different devices, associates a specific action such as the moving to the next level within an app or buying a specific subscription to an ad or multiple ads delivered within another site/sites or app/apps on same device or associated devices, where the ad or ads were viewed by an audience with specific profile attributes.

Central ID elimination puts targeted advertising and attribution in jeopardy.

Apple® has already eliminated third-party cookies from its Safari® browser by blocking third-party cookies by default. Firefox has done the same by blocking third-party cookies from its browser by default. Google plans to eliminate third-party cookies from its Chrome browser, which has the majority of the browser market, by early 2022.

Apple plans to turn its iOS generated central ID, used to identify a device's mobile apps, known as IDFA (ID For Advertisers, a type of MAID), to opt-in based with the release of iOS14 in mid-September 2020. Conditioning IDFA usage as the device's mobile apps central ID, on the device user opting-in to tracking, is expected to significantly reduce IDFA prevalence to the point where it could not be used for targeted advertising and attribution.

Apple has further released a privacy policy for its app store, expected to bind app developers and companies with SDKs (Software Development Kit) embedded in apps, for apps available through the apple app store. The policy states the following (see https://developer.apple.com/app-store/user-privacy-and-data-use/):

"With iOS 14, iPadOS 14, and tvOS 14, you will need to receive the user's permission through the AppTrackingTransparency framework to track them or access their device's advertising identifier. Tracking refers to the act of linking user or device data collected from your app with user or device data collected from other companies' apps, websites, or offline properties for targeted advertising or advertising measurement purposes . . . .

Examples of tracking include, but are not limited to: . . . .

Sharing a list of emails, advertising IDs, or other IDs with a third-party advertising network that uses that information to retarget those users in other developers' apps or to find similar users.

Placing a third-party SDK in your app that combines user data from your app with user data from other developers' apps to target advertising or measure advertising efficiency, even if you don't use the SDK for these purposes . . . .

You may track users without obtaining user permission through the AppTrackingTransparency framework if it is for one of the following purposes:

When user or device data from your app is linked to third-party data solely on the user's device and is not sent off the device in a way that can identify the user or device."

Apple's privacy policy, while not the law, sets even a higher bar with its policy, as it limits the usage of any ID originating from a mobile app to target the device user across apps or measure attribution across apps.

Apple itself offers a solution named SKAdNetwork to enable the attribution of an app (installed following a clicked ad) to the ad and to the app where the ad was delivered within its ad space, without identifying the converting device. The attribution is expected to take place on the device itself, aligning with Apple's privacy policy. See https://developer.apple.com/documentation/storekit/skadnetwork. Unlike the granular attribution facilitated by a central computer system using central IDs, though, SKAdNetwork is limited. One example of its limitations is the attribution of the conversion (the app install in this case) to last click, which does not give credit to previously delivered ads that advertised the same app, which had an important contribution to the resulting app install.

The systems and methods discussed herein accurately attribute an action to an ad with data originating from the device, without a central ID, while aligning with the privacy policy of Apple (or other firms in the future) that does not allow to use data originating from the device for cross-app measurement or cross-site measurement.

The disclosed computerized machine, computer system (comprising one or multiple computers), and techniques may (not must) achieve various practical objects and offer various practical advantages, some of which may be described above. Objects or advantages also may become apparent upon referring to the examples disclosed below.

In addition to the considerations above, the prior art also includes the field of differential privacy, which is a system for publicly sharing information about a dataset by describing the patterns of groups within the dataset while withholding information about individuals in the dataset. The concept of differential privacy is that if the effect of making an arbitrary single substitution in the database is small enough, the query result cannot be used to infer much about any single individual, and therefore provides privacy. However, existing differential privacy systems do not provide for anonymized cross-application or cross-site attribution without use of central IDs.

SUMMARY OF THE PRESENT INVENTION

This summary is provided to introduce a selection of concepts in a simplified form that are further described below in more detail. This summary is not intended to identify key or essential features or to limit the scope of described subject matter. The abbreviation "CS" is used to refer to a computer system implementing disclosed methods.

Although different examples are described, here follows two main categories of examples, which bifurcate in part (C):

A. CS receives from client computer system impression and action data on original devices, which include: AppUID or SiteVID, or other site ID or app ID, App_name or Site_name, IP address, user-agent & other parameters.

B. For every impression or action data received, CS immediately checks to determine if the AppUID or SiteVID or other site ID or app ID or IP_address/user-agent/possibly_other_parameters of the reported impression or action within a device function (such device function can be an app or browser or software (e.g., native email software)) is already included in the device IDcluster of the CS. If an IDcluster is found, then CS further checks to determine ifan impression or action already took place on the device within the same function or another function on the device (device level) or if an impression or action already took place on an associated device, on a person-level or household-level or office-level or other level. The result is an AdTrail data set, which is defined as the client-reported impression or action and the original device on which the impression or action took place as well as (if relevant) the previously delivered impressions or previous actions taking place on the same device or associated devices identified by CS.

C. In real-time, following the identification of the AdTrail data set, CS creates a copy of the AdTrail data set with the goal of turning client's impression and action data into aggregated data and as such unusable for cross-app or cross-site targeting, since CS itself won't be able to distinguish between the original device where a real impression or action took place and the selected 'copy device' to which was attached made-up impression or action data mirroring the impression or action reported by the client.

In a first example—where copy devices created for prior impression or action on original devices could be identified when the original devices or devices associated with the original devices are exposed to the next impression or next action takes place on them—the latest impression or action data is added to the copy devices or to devices associated with the copy devices, or all impression and action data can be attached to new copy devices and the old copy devices deleted.

In a second example—where copy devices created for prior impression or action on original devices cannot be identified when the original devices or devices associated with the original devices are exposed to the next impression or next action takes place on them—new copy devices are selected and then prior copies are removed to ensure not more than one copy will remain in CS database. Removal of prior copies is achieved using a Removal_Table created in part (D).

D. CS creates a Removal_Table. Devices like the ones identified in the Removal_Table are removed prior to the attribution calculation for the second example. For the first example, a Removal_Table is not used.

E. CS attribution calculation—

In response to a client attribution calculation query, CS calculates attribution as follows:

For a given criteria, such as a specific advertiser (identified by an advertiser ID), running a specific campaign (identified by a campaign ID), running from an identified first date to an identified second date, resulting in a specific action such as app install or app session or site visit of an identified app or site respectively, depending on the example chosen:

If it is the first example, Removal_Table is not used.

If it is the second example, then, using the Removal_Table created in part (D), devices like the ones identified in the Removal_Table are removed prior to the attribution calculation.

In some examples, all impressions and actions matching the given criteria (after removal of relevant devices identified in the Removal_Table if second example; without using a Removal_Table if first example) are aggregated, the attribution ratio is calculated, and the aggregated results are sent to client computer system.

As long as no single device could be identified as a result of reports CS provides to a client, CS can further provide the client with reports that include different breakdowns, such as number of impressions and actions, on number of devices of different types, at different association levels, as well as any other figure.

As the number of impressions, actions and devices is double in the CS database of what it is in reality (in case part (C) involves the creation of only a single AdTrail data set copy), while the conversion ratio between the impressions and actions stays the same and can be reported by CS to client as is, the number of CS reported impressions, actions and devices is halved to reflect reality.

In other examples, instead of halving the numbers, when Removal_Table is not used—because, for example, the original devices and their copy devices could be identified (without knowing which is the original and which is the copy)—one of the duplicates (whether the original or the copy is not important since identical) is removed prior to the attribution calculation or attribution analysis. That way the attribution analysis is done on a snapshot mirroring the original devices where the real ad impressions and real actions took place. Even though some of the devices making up the snapshot are copy devices and the ad impressions and actions associated with them are made up, because they mirror the original devices where real ad impressions and actions took place, the same granular attribution analysis can be made using the snapshot as the attribution analysis that would have been made using only the original devices.

BRIEF DESCRIPTION OF THE DRAWINGS

Embodiments of the present invention will now be described by way of example with reference to the accompanying drawings:

FIGS. 2A-2E, 3A-3G, 4A-4K, and 5A-5I, each taken together, illustrate, via spreadsheet data, examples of logged ad impressions and action data that are used for attribution.

FIG. 7 illustrates a flowchart for implementing the embodiments of FIGS. 6A-6C.

FIG. 8 shows examples of device identifiers that can be included in a device ID cluster used in embodiments of the present invention.

DETAILED DESCRIPTION OF THE INVENTION

Figure 1:
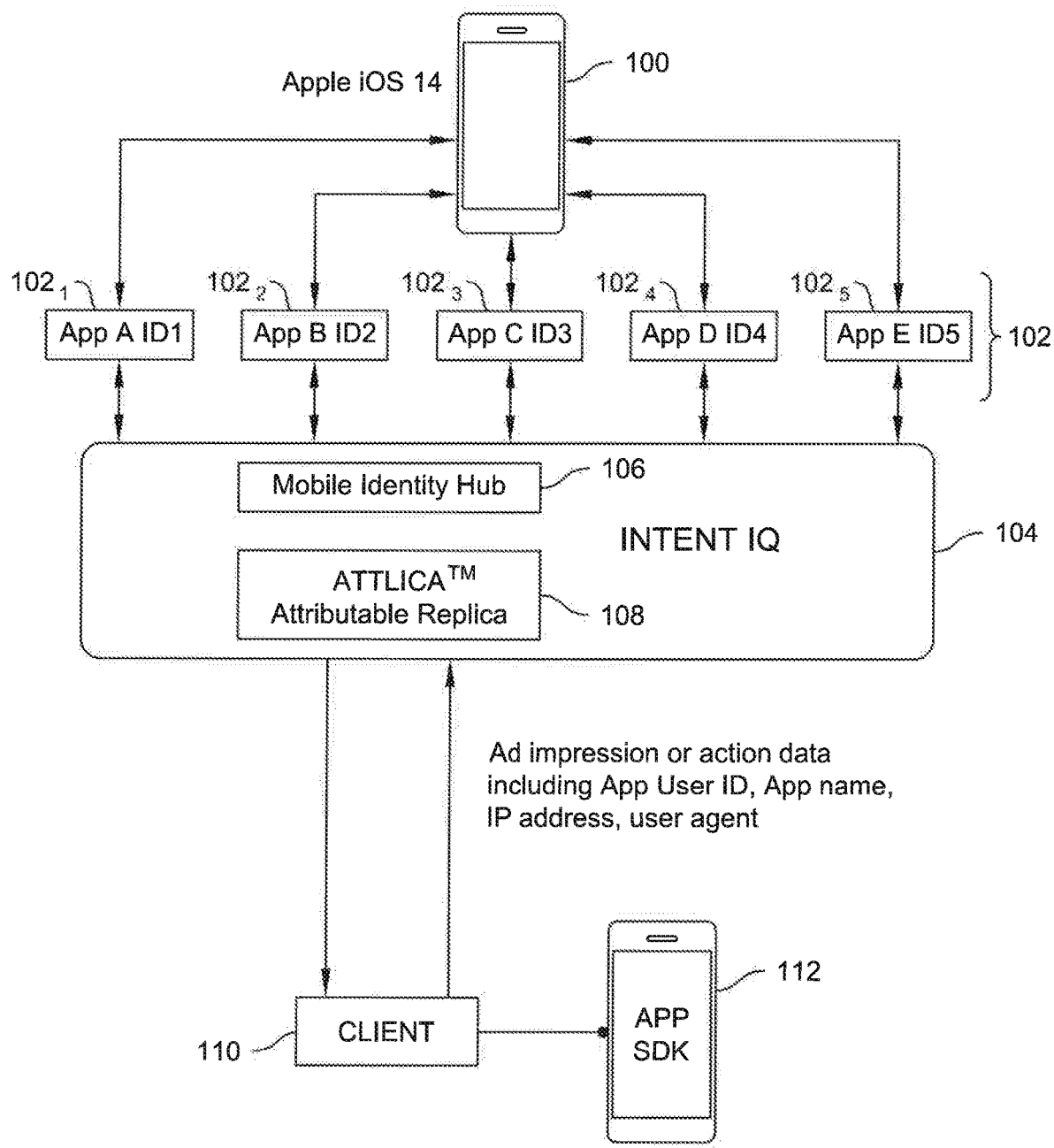
FIG. 1 is a high-level schematic diagram of the interactions of various components that are involved in one example of the present invention.
Figure 2A:
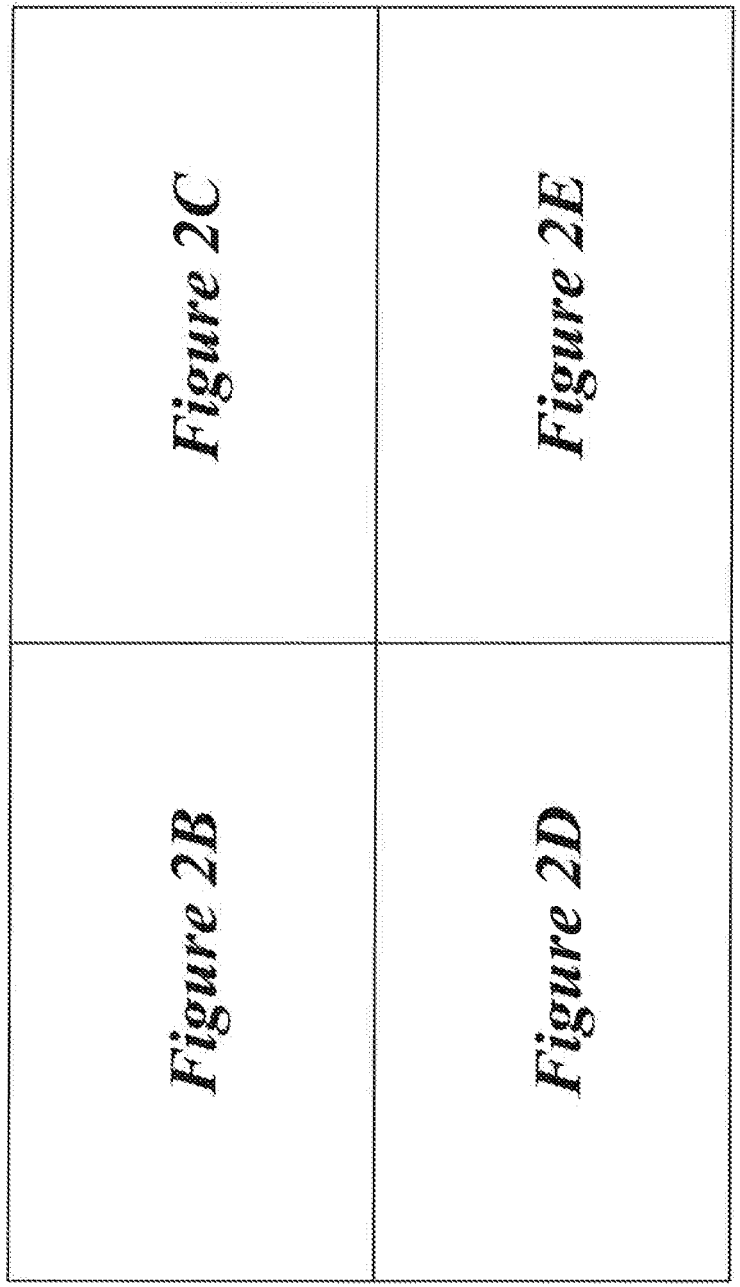
Figure 5H:
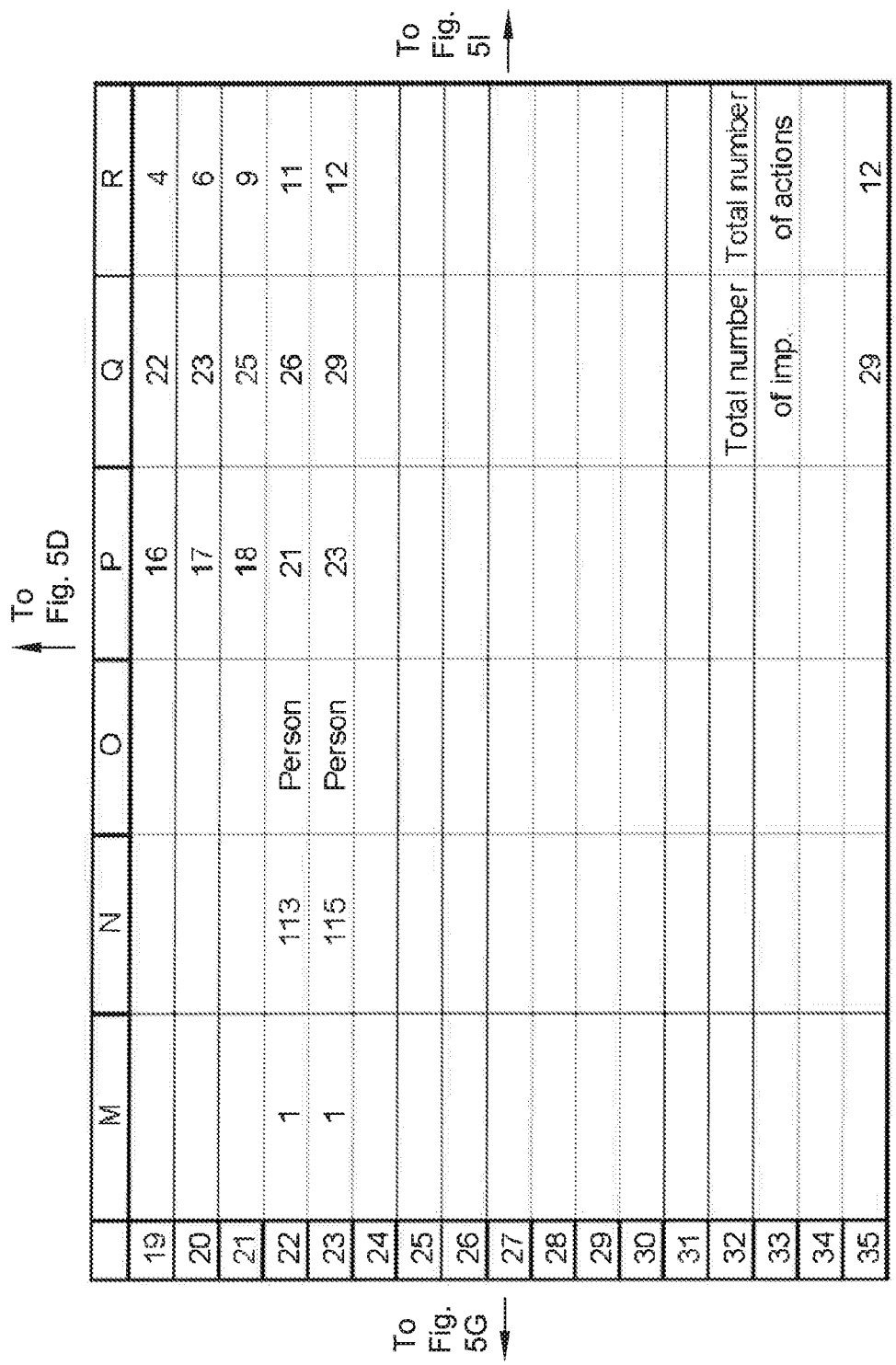

Certain terminology is used herein for convenience only and is not to be taken as a limitation on the present invention.

The words "a" and "an", as used in the claims and in the corresponding portions of the specification, mean "at least one."

I. OVERVIEW

The overview below is described in the context of an identity resolution service, namely, Intent IQ (IIQ), located in Long Island City, N.Y. More specifically, the overview is described using Intent IQ's Mobile Identity Hub (MIH) service, which relies on Intent IQ's device graph technology. (MIH is a clustering of first party IDs per device, such as app IDs.) However, the scope of the present invention is not limited to this specific identity resolution service or its device graph technology, and may be implemented using other well-known identity resolution services and device graphs. Device graphs are well-known in the art, and thus are not described in further detail herein.

The Intent IQ technology is further described in the context of an enhancement referred to as Attlica™, which is an acronym for "attributable replica." The technology of Attlica is a key aspect of the present invention.

When a client's IDFA-less data is assigned to a device by Intent IQ, the data is immediately turned into aggregated data, to avoid device-specific cross-app attribution. This aligns with Apple's App Store privacy and data use practices.

With the launch of Apple iOS 14 and the deprecation of the IDFA, it is no longer possible to disclose the identity of devices on which ad impressions and actions take place. However, Intent IQ is able provide the same granular attribution post-iOS 14, in scale and with the same accuracy, as pre-iOS 14.

How Does it Work?

1. Intent IQ's Graph clusters app-user IDs by device, without Intent IQ targeting ads across apps on any particular device.

2. When Intent IQ receives data defining an ad impression or action (app install, in-app purchase, or other), including the app user ID, app name, IP address, and user-agent, Intent IQ checks if the app user ID belongs to a device ID cluster. If it does, in real time, Intent IQ's computer system selects a different device from its North American graph having the same user-agent and attaches a copy of the received ad impression or action data to it. Intent IQ calls the selected device a "copy device."

3. An Intent IQ customer can ask Intent IQ to use one, or more than one, copy devices.

4. By assigning the same ad impression or action data to the copy device, Intent IQ will be unable to distinguish the device on which the ad impression or action took place from the copy device.

5. Effectively, the process turns the client's data into aggregated data, therefore denying Intent IQ the ability to measure attribution on an individual device (because the ad impressions and actions associated with any given device may be made-up).

6. When additional ad impressions are delivered to a device, or actions take place on the device, they are also attached to the copy device.

7. Maintaining the same ad impressions and same actions on multiple devices prevents identification of individual devices, thus aligning with Apple's App Store privacy and data use practices.

8. Despite the existence of the "copy devices," Intent IQ still can calculate attribution exactly, and can offer clients granular attribution analysis, just as before.

FIG. 1 shows a high-level schematic diagram of the interactions of various components that are involved in one example of the present invention implemented to address the deprecation of IDFA in Apple's iOS 14. FIG. 1 shows a device 100 that includes a plurality of apps 102 (labeled $102_1$-$102_5$), each having an identifier (referred to below as an AppUID). Activity and ad impressions associated with the apps 102 are received by an Intent IQ computer system 104 that is composed of multiple servers, which maintains a Mobile Identity Hub 106 and Attlica (Attributable Replica)

108. FIG. 1 also shows client 110 and App SDK 112 which are in communication with the Intent IQ computer system 104.

Intent IQ's Mobile Identity Hub 106 clusters device app user ID's (AppUID's) without Intent IQ targeting ads across apps on the device.

Intent IQ's Attlica 108 performs at least the following functions:

1. Receive from the client 110 ad impression or action data.
2. Identify the device
3. Associate ad impression/action with the identified device
4. Select copy device with the same UA (user agent).
5. Attach same ad impression/action to the copy device
6. Send client-aggregated attribution results and granular attribution analysis without identifying individual devices.

Using the components described above, Intent IQ cannot distinguish between the devices where the real ad impression/action took place, and the device with the made-up ad impression/action. As a result, Intent IQ cannot measure attribution on an individual device because the ad impression and actions associated with it may be made up.

II. DETAILED DESCRIPTION OF CERTAIN EXAMPLES

With no central ID to identify different sites visited by the same browser or different mobile apps used by the same device user, a computer system identifies a browser across sites or the same device across apps by clustering separate IDs (IDcluster) originating from the different sites (such as first party cookie IDs) and apps (such as app user IDs) by browser and mobile device respectively.

That is, instead of a third-party cookie being used by a web server to identify that the same browser visited 200 (for example) different sites, the same browser can be recognized by clustering 200 first party cookie IDs reported by each of the visited sites (SiteVIDs). Such an IDcluster enables the identification of supposedly separate visited sites as having been made by the same browser.

Also with respect to apps, instead of a MAID (such as an IDFA) being used by a web server to identify a number of different apps (for example 50 apps) as used by the same device, the same device can be recognized by clustering those 50 app user IDs (AppUID) reported by each of the used apps (either by the app developer or an SDK embedded in the app by a third-party such as an MMP or Mobile Measurement Partner). IDFV or ID for Vendor on Apple's iOS operating system, which is the same ID "for apps that come from the same vendor running on the same device," is another example of an ID that can be clustered. Such an IDcluster enables the identification of supposedly separate used apps as having been used on the same device.

In some examples, the IDcluster further includes an ID of the device (deviceID), whether such ID was generated by the CS or an ID associated by the computer system with the device, such as an email address collected when the email address was used on an app or to login on a site or app on the device. Other possible IDs are historical IDs of the device such as historical MAID, historical third-party cookie ID, or other IDs.

In other examples, there is no app user ID (AppUID) or site visitor ID (SiteVID), only IP address and user agent and possibly other variables characterizing the device, such as screen resolution, font size, font type, browser extensions, and so forth. In such examples, the IDcluster includes an ID of the device (deviceID). In addition to the deviceID, the cluster may include the app name or site name, even though there was no ID associated with those apps or sites in this group of examples.

An IDcluster clustering SiteVIDs or AppUIDs or other site ID or App ID such as IDFV, identifies a device function, such as the sites visited by the browser function, or identifies the apps function, by identifying the apps used on the same device.

IDclusters identifying functions on the same device, such as two different browsers (Chrome and Edge for example) or a browser and mobile apps, can be associated.

Devices can be associated on different levels by associating the IDclusters identifying those devices.

The clustering can be achieved using probabilistic methods, such as those relying on common IP address and user agent, or deterministic methods relying on the collection of PII, such as email addresses or other methods, or a combination of any of those methods.

The collection of associated IDclusters on a device level, person level, household level, office level, or other level, for multiple devices representing many people, is referred to as a device graph.

To align with Apple's privacy policy or similar future policies from other firms, the IDcluster created by the CS is not used by that computer system for cross-app or cross-site targeting or attribution.

In certain detailed examples, the following processes can take place:

(A) CS Receives Client Data

The CS, made up of at least one server, receives from a client company computer system, made up of at least one server, looking to attribute an action to ad impression, the following data fields, for each delivered ad impression and for each action:

For each ad impression:
1) Time/date of ad delivery
2) IP address
3) User agent
4) App name or site name where the ad was delivered
5) AppUID (App User ID) or SiteVID (Site Visitor ID, such as the site's first party cookie ID for example)
6) Advertiser ID
7) Campaign ID
8) Creative ID
9) Cost of ad space where the ad was delivered
10) Attribute IDs (one or more) of profile attributes included in the profile of the ad viewer, which profile attributes presence were some or all of the targeting criteria used in selecting that ad viewer to receive the ad. Examples of profile attributes are demographic data such as gender, age and household income, other apps downloaded by the device user, such as 'candy crush', previously visited sites such as 'car research sites' category or cars.com specifically, and so forth.

In some examples, certain of the fields may be identified as optional or "if available."

In some examples, instead of AppUID or SiteVID or, in addition thereto, other ID or IDs that can be clustered can be provided, such as IDFV.

In some examples, instead of providing items 6-10 (all of them or some of them), an impression typeID is provided by the client, where that single impression type ID is associated in the client's database with those items.

For example, instead of client informing CS that the ad viewed originated from Advertiser #5, included in Campaign #7 and used Creative #18, the client may in such examples provide CS only with impression type ID #769, while in its own client database the client associates impression type #769 (given to CS) with the following information: Advertiser #5, Campaign #7, Creative #18.

In some examples, instead of attributes IDs, the attributes themselves are reported in raw format.

For each action:
1) Time/date of action
2) IP address
3) User agent
4) App name or site name where the action took place
5) AppUID or SiteVID
6) Advertiser ID, which action is related to, to enable CS to tie impressions and actions to same advertiser. In some examples, Advertiser ID is not used since the app or site belongs to the advertiser, so, by definition, any action related to that app or site can be tied to impressions from the same advertiser.
7) Attributes IDs (one or more) describing the action such as 'app install', 'app session', 'site visit', 'specific section of the app visit', 'specific section of the site visit', custom event ID, the product ID in which the device user (on the site or app) showed interest, or an ID representing the in-app or on-site type of purchase made, or an ID representing the subscription or any numbers characterizing the action such as the dollar amount of the action or a dollar amount range.

In some examples, instead of providing to the CS the attributes IDs or the numbers characterizing the action, an action type of ID is provided. That action type ID given to CS is associated in the client's database with the attributes IDs and numbers characterizing the action.

In some examples, certain of the fields may be identified as optional or "if available."

In some examples, instead of AppUID or SiteVID, or in addition thereto, other ID or IDs that can be clustered can be provided, such as IDFV.

In some examples, instead of attributes IDs, the attributes themselves are reported in raw format.

The information about each ad delivery and each action can be provided in real-time via server-to-server communication from client company computer system to CS, or by client computer system facilitating a redirect of an app or site to CS, or by client computer system sending a log file on an hourly basis or daily basis or other selected time period with all the ad impressions or actions that took place since the last log file. The log file can be provided to CS, for example, via an Amazon S3 (Simple Storage Service).

(B) CS Creates 'AdTrail' Data Set

For every impression or action data received, CS immediately checks if the AppUID or SiteVID or other site ID or app ID or IP address/user-agent/possibly_other_parameters of the reported impression or action within a device function (such device function can be an app or browser) is already included in the device IDcluster of the CS. If an IDcluster is found, then CS further checks if an earlier impression or action already took place on the device within the same function or another function on the device (device level) or if an earlier impression or action already took place on an associated device, on a person level or household level or office level or other level. The result is an AdTrail data set, which is defined as the client reported impression or action and the device on which the impression or action took place as well as (if relevant) the previously delivered impressions or previous actions taking place on the same device or associated devices identified by CS.

For example, if an ad impression was reported to be delivered within an app, CS checks whether an earlier ad impression from the same advertiser's campaign was delivered within another app (same function) on the same device or within a site visited using a browser (different device function) on the same device.

If the reported AppUID or SiteVID or other site ID or app ID or IP/user-agent/possibly_other_parameters are not found to be within an IDcluster, then the received data is meaningless and could not be used for cross-app targeting or attribution in case of an app, or for cross-site targeting or attribution in case of a site. CS stores the received data and waits to receive additional data points about the app or site where the impression or action took place, whether those data points are received from the client when the app is later used or the site visited, when another impression or action take place or other, or from other sources. As soon as CS is able to cluster the AppUID or SiteVID or other site ID or app ID or IP/user-agent/possibly_other_parameters using the additional data points, CS retrieves the previously reported impression or action as well as any following impression or action within the same app or site, and in real-time identifies the AdTrail data set.

In other examples, as soon as CS is able to identify the IDcluster to which the AppUID or SiteVID or other site ID or app ID or IP/user-agent/possibly_other_parameters, belong, or alternatively to cluster them if they were not already in an IDcluster, CS associates the received impression or action data with the deviceID of the IDcluster and deletes from CS database the IP address received as part of the impression and action data.

(C) CS Selects 'Copy Devices' and Assigns Made-Up Impression and Action Data

In real-time, following the identification of the AdTrail data set, CS creates a copy of the AdTrail data set by randomly selecting other devices with the same user-agent and the same associated device functions and same level associations between the devices, as compared to the devices in the AdTrail data set where impressions and actions took place. CS attaches to each of those selected devices the same impression or action data; the same as those that took place in the AdTrail data set identified in part (B). The devices reported by client to CS in part (A) as devices where impression or action took place will be referred to as 'original devices'. The randomly selected devices in part (C) will be referred to as 'copy devices'. As a result of selecting copy devices with the same user-agent, the same device-functions associations and the same device associations as the original devices and assigning to the copy devices the same impressions and actions data as those that took place on the respective original devices, CS cannot tell the difference between the original devices and the copy devices.

In other examples, in part (B), CS deletes the IP address from the received data for an impression or action, as soon as the data can be associated with a deviceID. As a result, picking up a copy device is simpler, since analyzing a copy device candidate IP address characteristics to make sure it aligns it with the original device IP address characteristics can be skipped. If the IP address of the original device impression or action data had not been deleted, an analysis done by the CS might be able to distinguish between an original device and a copy device by analyzing their IP address.

In other examples, when creating a copy of the AdTrail data set, if the original device had an AppUID or SiteVID as part of the impression or action data, CS makes up an AppUID or SiteVID respectively for the copy device. This way, CS could not utilize the presence or non-presence of AppUID or SiteVID in similar devices with the same impression or action data to help distinguish between a real device with real impressions and actions and a copy device with made-up impressions and actions. Because the same app could have several AppUIDs if several SDKs embedded in the app generate them and because the same site could have several SiteVIDs if the site enables a third-party to operate under their domain and drop first party cookies this way, CS does not have the ability to identify a copy device even if, in addition to the made-up AppUID or SiteVID, the copy device user uses the app or visits the site and receives new AppUID or SiteVID respectively for them. In other words, the presence of two or more AppUIDs for the same app, or the presence of two or more SiteVIDs for the same site, is not an indicator of a copy device.

In other examples, to make sure that CS is not able to tell the difference between the original devices and copy devices, when assigning impression and action data to the copy devices, the time of the made-up impression or action is randomly selected as taking place several seconds or minutes or hours, or another time period, before or after the real impression or action. As a result, sometimes the copy device made-up impression or action takes place before the original device real impression or action and sometimes afterwards, so CS is not able to tell the difference between the original devices and real impressions and actions and the copy devices and the made-up impressions and actions.

In other examples, the assigned made-up impression and action data include the exact same time stamp as the real impression and action. This prevents CS from distinguishing between the real and made-up impressions and actions but limits the pool of possibilities (which one is made-up and which one is real) to the devices targeted with the same creative/campaign/advertiser at the same time.

In such examples, while the first impression or action on an original device leads to the selection of a copy device and the assigning of a made-up impression or action to the copy device, when a second or third or higher number of impressions or actions on the same original device takes place, the CS might be able to identify the copy device, because it will be the one with the same creative/campaign/advertiser at the same (or close enough) time as the original device for the original device's previous impressions or same app or site and same action type at the same (or close enough) time as the original's device previous actions. In yet other examples, the original device and its copy device can be linked in the database at the time the copy device is selected without marking which device is the original and which one is the copy. Once the copy device is identified—instead of the CS newly selecting another copy device and assigning to it, as made-up impressions and actions, (i) the newly reported impression or action and (ii) the same historical impressions and actions as on the original device—CS can skip the selection of another copy device and instead add just the newly reported impression or action on the original device to the copy device created for the original device when an earlier impression or action took place on that device.

When an impression or action is reported on an original device with no history of impressions and actions, and the AdTrail data includes another device identified as an associated device of the original device, which associated device was already exposed to impression or action that took place on it, the following might take place:

If CS is able to identify the copy device of the original associated device (for example, using the historical impressions and actions data of the original associated device or a link between the original and copy devices in the database), CS is limited in selecting a new copy device for the original device reported in part (A), out of the devices associated with the identified copy device. If the AdTrail data indicates that the original device in part (A) was associated on a 'Person' level, for example, with the associated device on which historical impressions or actions took place, if the copy device of the associated original device does not have any device associated with it on a 'Person' level, CS has no copy device to which it can assign the same made-up impression or action as that reported in part (A). Selecting a random copy device to do that assignment does not work, because, for the attribution to work accurately, the made-up impressions and actions take place on devices that truly exist and have the same relations among them as the original devices. i.e., that are associated on a 'Person' level for example, and have the same user-agents, etc.

In such a scenario, following CS identifying the copy device of the original associated device, CS selects copy devices for both the original device reported in part (A) and the original device associated with the device in part (A) (from the AdTrail data), the device on which impressions or actions took place prior to the impression or action reported on the device in part (A), and in each case the selected copy devices have, at a minimum, the same user-agent and same associations level among themselves as the original devices. In that way CS could not distinguish between the original devices and the real impressions and actions and the copy devices and the made-up impressions and actions by utilizing CS's graph to identify that an association level between devices is not true, therefore identifying the devices supposedly tied in such an association level as copy devices.

Another implication of such examples is that the copy device selected for the associated original device, when impression or action was reported on the original associated device, is deleted from CS database, along with its associated impressions and actions. The deletion is desired because another copy device for the original associated device is selected in this portion of the method as part of the process of finding copy devices associated the same way as the original device from part (A) and its associated device. If the deletion does not take place, the original associated device is mirrored by two copy devices with their impressions and actions data instead of by just one copy device, which will skew the attribution results.

In other examples, deletion action by the CS is minimized when selecting a copy device for an original device where an impression or action takes place for the first time and there is no associated device where related earlier impressions or actions (related to same advertiser) took place, according to the following process:

CS selects a copy device for the original device, which copy device has the same associated devices in terms of user-agents and association level as the original device. This way, if and when a real impression or action takes place on a device associated with the original device, CS will have a ready-made copy device to select, already associated with the copy device of the original device; in the same way, the reported associated device is associated with the original device.

Regardless, some deletion may still take place, for example to address situations where, after the first impression or action on an original device, the CS adds a function association on the same device, such as identifying a second browser on the same device, or where the CS adds an association for an entirely new device. The reason such deletion still happens is that the copy device selected at the time the first impression or action was reported did not include the new associations created for the original device after the first impression or action.

In other examples, CS deletes the time the real impression or action took place and only leaves the date. Therefore, when assigning the same date to made-up impressions and actions, CS is not able to distinguish between the real and the made-up impressions and actions, since the pool of devices on which impressions and actions took place covers an entire day. In a typical campaign, the number of devices in a day is a very large number. Even a small campaign, for example, may address thousands of devices per day.

To further ensure that the CS is not able to tell the difference between the original devices and copy devices, in other examples, the client is asked to send information that could be used to identify a device, if collected by CS from a third-party, as an ID, without telling the CS what the ID represents. For example, the client can send in part (A) along with impression data, profile attributes IDs 7, 15, 17 & 20, without telling CS that attribute #7 represents a female, attribute #15 represents age range 35-40 years old, attribute 17 represents four children in the household, and attribute #20 represents the presence of the 'candy crush' app on the device on which the impression was delivered.

As a result, selecting copy devices is simpler for CS, because the pool of devices available for the selection is much larger than if CS had been limited only to a device used by a female, age 35-40, with 4 children in the household and 'candy crush' app on her device. Further, if the client reports profile attributes in raw form to CS and CS assigns the same profile attributes in raw form to copy devices without checking that the assigned profile attributes are true to the copy device user, CS will be able to identify the copy devices, by using a third-party data source providing demographic information for example. Such a process will inform CS that although a device is supposedly associated with a female, age 35-40, for example (the profile attributes attached to the made-up impression data), that device in reality is used by a male, age 20-25. To avoid such a scenario, CS can attach the impression data only to a copy device having a device user profile that matches the original device's user profile attributes. Further, selecting associated devices with profile attributes that match the original associated devices' profile attributes narrows the pool of copy devices available for selection and increases the risk that, in a campaign targeting a narrow target audience (i.e., a campaign targeting persons having many profile attributes in combination), the copy devices will also end up targeted with the advertiser's campaign ads, which will skew the attribution results. Receiving from the client the impression data with profile attributes listed as IDs instead of listed in raw form, therefore, enables CS to select copy devices out of a larger pool of devices, without being able later to determine that the profile attributes assigned to the copy devices (which are the same as the ones reported for the original devices) are not really representative of the copy devices' users profiles.

The reason for the creation of a copy AdTrail data set having copy devices and made-up impressions and actions, created in real time as soon as a real AdTrail data set is identified in part (B), is to ensure that, at no time can the data in the CS database be used for targeting or attribution across apps or sites, because CS itself cannot tell the difference between the original devices and the copy devices, or between the real impressions and actions data and the made-up impressions and actions data.

The made-up impressions and actions data is identical to the real impressions and actions data received from the client and includes all the data fields received from the client for the impression or action except the following:

(i) IP address, which is deleted in some examples and therefore non-present in the copied data set, is different (if not deleted in the above-described example), or the same in yet other examples;

(ii) the time stamp, which is different for the made-up impressions and actions in some examples, the same in other examples, or non-existent in other examples; and (iii) the AppUID (if received) or SiteVID (if received) or other site ID (if received) or app ID (if received), which is different in some examples, not present in the AdTrail copy data set in other examples, or the same in yet other examples.

The copy devices selected by CS are devices that truly exist; just the impressions and actions data attached to them are made up. In a country the size of the USA, for example, with a population of 328M people in 2019, when selecting devices randomly to be assigned made-up impressions and actions, the odds of those devices being included in the real campaign are slim.

The randomly selected copy devices are selected from a pool of devices that truly exist and that have the same association level as the original devices, for example, 'person' level devices. That ensures that CS cannot tell, using the CS graph, whether the actions or impressions are made up by checking that the devices that are supposed to be associated at a certain level (e.g., person level) are in reality not associated on such a level (or indeed not associated on any level).

Creating an identical AdTrail data set also ensures that, in terms of attribution, the ratio between impressions and actions and the device functions and devices on which they took place remains the same. So, although the client data was turned into aggregated data, as soon as the data can be identified as belonging to an IDcluster, by copying that data, granular attribution in every aspect could still be provided.

Before reporting the number of impressions and actions to a client on an aggregated basis, the CS simply divides by 2 the number of impressions, actions, devices, etc.

For the same reason, instead of creating a single AdTrail data set copy, CS can create two copies, three copies, or any other number of copies. Likewise, CS will not be able to determine which impressions and actions are real and took place on original devices and which impressions and actions are made up and assigned to copy devices.

Using more than one copy can be done to reduce the possibility that a given proprietor of a CS can retain the capability of using the data for advertising, even without distinguishing between real and made-up impressions or actions, through an expedient of targeting both original and copy devices, even though doing so would waste half of the campaign budget knowingly on copy devices. CS might do this because getting 50% of the devices that are original devices with real actions might be viewed as still worthwhile. If such becomes a concern, the number of copies can be increased. If 9 AdTrail copies are created, for example, it is far less likely that a CS would conclude that it makes sense to waste 90% of a campaign budget just to hit 10% of the devices that truly took an action.

Depending on the number of AdTrail data set copies created, the results are divided to reflect the number of extra copies by a number equal to 1 plus the number of created copies. So if 2 AdTrail data set copies are created, for example, then the CS database has 3 impressions on 3 devices for every impression on a single device, so while the ratio of actions to impressions stays the same, the number of reported impressions, actions, and devices is divided by 3.

(D) CS Adds to a 'Removal_Table'

There will be instances in which CS, when processing AdTrail data in part (C) regarding an impression or action on a given original device that was included in the AdTrail data, cannot find in the database a copy device selected on account of a previous impression or action on that original device or a previous impression or action on another device that has been associated with original device. In such instances, as a result of the selection in part (C) of new copy devices mirroring the devices included in the AdTrail data, the CS database would then include multiple copies of the previous impression or action data on the original device or another device associated with the original device. For example, where the process in part (C) had created only a single AdTrail data set copy, the CS database would then include a second copy of previous impression or action data. In that scenario, before any attribution calculation takes place (which calculation could take place at an unknown time), CS removes one of the two copies (or all but one copy, if there are more than two copies in all). Not doing so would skew the attribution results because, in a simple example of an original device and two copy devices created for different impressions or actions on the same original device, the same impression that was supposed to be copied only once, now appears three times in the CS database—once on the original device, once on the copy device created for that impression at the first time, and once on a second copy device created for a follow-up impression or action on the original device. If, during attribution, CS were to divide the number of impressions by 2, that would be counted as 1.5 impressions instead of 1 impression.

Although the Removal_Table facilitates the removal of the devices with such extra copies (of impression and attribution data) before any attribution calculation, the removed devices are not deleted from CS database; they are just removed temporarily while an attribution calculation is done for a client. Said differently, these devices are not included in the attribution calculation. The reason such extra copies are not deleted, just not included in the attribution calculation, is that the removed devices might be original devices, not copy devices. If the CS were to delete an original device along with its associated ad impressions and actions, that would result in a problem: If client were to report another ad impression or action on that original device, it would be counted as the first impression or action for that device, and the ad impressions and action history of the original device would be ignored, which would skew the attribution results. On the other hand, temporary removal of one of the copies for the attribution calculation will not create a problem because, even if CS were to remove temporarily an original device with real impression or action data (as it can't tell the difference), so as to exclude it from the attribution calculation, the attribution calculation will remain accurate, because a replica of the real impression or action data, attached to a copy device, is still included in the calculation.

Likewise, when selecting a device to be included in the Removal_Table, the device is not identified by an IP address, AppUID, SiteVID, other site ID or app ID or deviceID, but rather just by the other characteristics of the device (user-agent, device association, etc.) and by the impression or action data that took place on the device. That ensures that a device with a replica of the impression or action data is removed in any future attribution calculation, even if another impression or action occurs on a device earlier selected for removal (e.g., if it turns out to be an original device).

For example, suppose an original device with deviceID #2345 has a first impression on Aug. 2, 2020, and CS selects a first copy device and assigns made-up impression data. Further suppose that a second impression, also on original device #2345, takes place the following day. Because CS does not know, in this example, which of the devices with same user-agent that have a single impression from the same advertiser's campaign is an original and which one is a copy, CS cannot assign a second made-up impression to a device with same user-agent that is already showing a single impression from that same advertiser's campaign, on account of the August 2 impression. Therefore, CS selects a second copy device for the original device, and made-up data of 2 ad impressions is attached to that device, mirroring the original device's 2 impressions data. CS adds to the Removal_Table a device with same user-agent as the original device and a single impression data, mirroring the original device first impression data without any device identifiers. In this example, for an attribution calculation, out of the many devices matching the device user-agent and the advertiser's campaign and creative that were exposed only to 1 impression that took place on August 2 (all info from the Removal_Table), CS selects the device identified by deviceID #7856 for removal prior to the attribution calculation.

CS didn't know that, at the time of selection of device #7856, it was an original device that a few days later was exposed to a second impression. Before the next attribution calculation, though, CS simply picked for removal another device out of the many devices matching the device user-agent and the advertiser's campaign and creative that were exposed only to 1 impression that took place on August 2 (all info from the Removal_Table). Device #7856 itself was not considered for removal by CS since it no longer matches the criteria in the Removal_Table (because it was exposed to 2 impressions). The process of CS selecting a device different than #7856 for removal preserves the attribution calculation, because device #2345 still has 2 copy devices with the 1st impression from the same advertiser's campaign and creative that took place on Aug. 2, 2020, when for correct attribution calculation only one such copy should have been included (when in part (C) only one AdTrail data set copy is created). For accuracy of the attribution calculation, a copy device no longer representing the current impressions and actions that took place on device #2345 should be removed. Specifically what should be removed is a device similar to or the actual copy device created for the first impression on device #2345, not a device with 2 impressions from that advertiser, which represents the current state of device #2345.

Therefore, CS adds the following to a 'Removal_Table':

(D1) In cases where the device reported by the client in part (A) are previously exposed to ad impressions or actions that took place on that device, the following takes place—

(D1.1) If in part (A) an impression is reported that is not the first impression on that device, i.e., the AdTrail data set includes data on impressions previously delivered on that device (whether delivered in the same function or different function from the last impression's function), CS adds to the Removal_Table a device identical to the one reported in part (A), except the device impressions data does not include the last reported impression data from part (A). The device impressions data only includes the impressions delivered on that device until, but not including, the last impression. Previous actions data on that device, if any exist, are copied to the device added to the Removal_Table. So, for example, if the device was exposed to 3 ad impressions, when the 3rd impression is reported in part (A), the device added to the Removal_Table includes the first 2 ad impressions data but not the 3rd ad impression data.

(D1.2) If in part (A), an impression reported is the first impression on that device, but actions took place on that device prior to the reported impression, i.e., the AdTrail data set includes data on actions previously taking place on that device (whether taking place in the same function or different function from the function where the reported impression was delivered), CS adds to the Removal_Table a device identical to the one reported in part (A), except the device does not include any impressions data, i.e., it does not include the last reported impression data from part (A), just the data on actions that took place on the device prior to the reported first impression.

The same process (D1.1 and D1.2) applies equally to actions data instead of impression data:

Previous impressions data, and previous but not current actions data, are copied to the device added to the Removal_Table.

(D2) In cases where AdTrail data set of the device reported in part (A) includes associated devices (if such exist), where prior impressions or actions took place along with the impressions and actions data attached to them, those associated devices along with their impressions and actions data are added to the Removal_Table.

(E) CS performs attribution calculation or analysis and reports to client

In response to a client attribution calculation query, or upon expiration of a predetermined time (every 10 minutes, every hour, every day, or other period), or both, CS performs an attribution calculation as follows:

For a given criteria, such as specific advertiser identified by an advertiser ID, running specific campaign identified by a campaign ID, running from an identified first date to an identified second date, resulting in a specific action such as app install or app session or site visit of an identified app or site respectively, depending on the situation:

In a situation where copy devices created for prior impression or action on original devices cannot be identified when the original devices or devices associated with the original devices are exposed to the next impression or when the next action takes place on them, then using the Removal_Table created in part (D), CS removes devices like the ones identified in the Removal_Table prior to the attribution calculation.

In a situation where copy devices created for prior impression or action on original devices could be identified when the original devices or devices associated with the original devices are exposed to the next impression or when the next action takes place on them, so that the latest impression or action data could be added to the copy devices or to devices associated with the copy devices, or all impression and action data can be attached to new copy devices and the old copy devices deleted, a Removal_Table is not used.

In some examples, after removal of devices identified in the Removal_Table (where such a table is used), CS aggregates all impressions and actions matching the criteria, calculates the attribution ratio, and sends the aggregated results to the client computer system.

In other examples, where Removal_Table is not used, CS aggregates all impressions and actions matching the criteria, calculates the attribution ratio, and sends the aggregated results to the client computer system.

The criteria for an attribution calculation query can be just an advertiser ID and nothing more or can be a combination of parameters. One example attribution query can include:

An advertiser ID, campaign ID, creative ID, running on App_name or Site_name, for a cost range of $X-$Y, between first identified date and second identified date, where the impressions were delivered just in a named state or region, which impressions resulted in in-app purchase (identified by attribution ID describing in-app purchase) within a specific app (identified by App_name), within a stated number of days from the time the impression was delivered on same device as the app where the in-app purchase took place.

CS identifies all devices, and impressions or actions associated with them, that match the identified parameters. In examples where Removal_Table is relevant, before performing the attribution calculations, devices similar to the ones described in the Removal_Table are removed as described above.

In some example responses, CS can provide an aggregate report of the number of impressions matching the criteria, the number of devices the impressions were delivered to (as more than one impression could be delivered on same device), and the number of resulting actions and the number of devices the actions took place on (as more than one action could take place on the same device). CS can provide other breakdowns in some example responses, such as the user-agent of the different devices (user agent can be represented as a device type), where the impressions were delivered to, and where the actions took place. Various sorts of breakdowns can be provided so long as the provided breakdown information cannot lead to an identification of a single device.

CS can share attribution results in response to any client query, for example, as long as the number of devices matching the query exceeds 10 devices, or more than another agreed-upon number of devices set to avoid the possibility of identifying a single device. Even in situations where the attribution results exceed the set number of devices, CS can take steps or set limits to ensure that the attribution results shared by CS do not allow the client to identify a single device.

As the number of impressions, actions, and devices in the CS database is twice the real numbers (assuming part (C) involves the creation of only a single AdTrail data set copy), the conversion ratio between the impressions and actions can be reported by CS to client as is, or the raw numbers of CS reported impressions, actions, and devices can be halved and then reported, or both.

In other examples, a Removal_Table is not used. In such examples, the original devices and their copy devices can be identified, but without knowing which is the original and which is the copy. In such examples, one of the duplicates (whether the original or the copy is not important since they are identical) is removed prior to the attribution calculation or attribution analysis (i.e., one of the duplicates in not included in the attribution calculation or analysis, and as a result only a single duplicate is included). In this approach, the attribution analysis or calculation, including conversion ratio calculation, is done on a snapshot mirroring the original devices on which the real ad impressions and real actions took place. Even though some of the devices making up the snapshot are copy devices and the ad impressions and actions associated with them are made up, as they mirror the original devices where real ad impressions and actions took place, the same granular attribution analysis can be made using the snapshot as the attribution analysis that would have been made using only the original devices. As explained above in connection with the Removal_Table examples, only temporary removal of the duplicates is done, to avoid permanently removing an original device, which might cause a later ad impression or action thereon to improperly be considered the first impression or action on that device.

Another example of a combination of parameters for an attribution calculation query can be: a brand advertiser identified by an advertiser ID, campaign ID, creative ID, delivered between a first and second identified dates, on any device (laptop, tablet, PC, smartphone, CTV, game console), within any device function (such as browser or app), which results in a visit (identified by action attribution ID) to the brand advertiser's site (identified by site_name) on the same device or any associated device on a household level.

In that example, the CS identified the matching devices and applies the Removal_Table (if present) and provides the aggregate report as stated above. The aggregate report in this instance can contain, for example, the number of impressions and resulting number of site visits, with a breakdown of the number of impressions on each device type, with number of devices per device type, and number of resulting site visits on same device where an impression was delivered, and number of resulting site visits on devices associated on a household level, with a further breakdown of the device type and number of devices per device type.

When a Removal_Table is not used, the same snapshot process, as described above, can be applied.

When more than a single AdTrail data set copy is created in part (C), the same adjustment process, as described above, can be applied.

In other examples, where a Removal_Table is not used there may be situations where part (C) creates 2 AdTrail data set copies, i.e., the database includes ad impressions and actions for not only the original device but also for 2 copy devices (although CS cannot distinguish between the original and the copies). In such instances, the CS includes 1 of the 3 duplicates in a snapshot, mirroring the original device on which the real ad impressions and real actions took place. Attribution analysis and calculation is made using the snapshot, and results are shared with the client (provided that the results would not allow the client to identify an individual device).

Yet another example of a combination of parameters for an attribution calculation or analysis query can be: an advertiser wishing to get its app downloaded provides the advertiser ID, campaign ID, creative ID, campaign delivery date range with first and second identified dates, that results in an app download (identified by action ID) on the same device.

In an example response, CS reports the aggregate impressions to app-installs ratio with the following breakdowns:

Number of impressions delivered on number of devices (as more than one impression can occur per device), with a breakdown by device type and by names of apps where the impressions were delivered, and the cost range of impression delivery per app.

Number of app installs on number of devices (as an app might have been installed, uninstalled, and installed again), with a breakdown by device type and by the avg. number of impressions on each device type, where an install took place.

Names of apps where ad impressions lead to eventual app install within 7 days, where the apps are sorted based on the cost per install as calculated using the average number of ad impressions and their ad space cost per app before the resulting app download.

The same usage of Removal_Table (if relevant), the same adjustment process, and the same snapshot process, all as described above, can be applied.

Additional Included Material and Explanation

A "first example" of a process without a Removal_Table is included herewith and is illustrated with an annotated spreadsheet, with rows representing events happening at successive times and explanatory notes; another copy of the spreadsheet reveals the underlying formulas and equalities. A "second example" of a process with a Removal_Table is illustrated with a second spreadsheet (and formula copy), in similar format. See the discussion below regarding FIGS. 2A-5G.

Described herein are various examples of specific, improved computerized machines (including programmed computer or tangible storage medium that contains or stores computer program instructions) and associated techniques (methods or processes) capable of computer-estimating attribution data for clients cross-app, cross-site, or cross-device in situations without central identifiers and in an anonymized way.

For ease of description, the discussion focuses on certain example computers (CS) programmed to perform several example processes with certain features, with some discussion of variations, but various modifications, variations, features, and aspects are also taught.

A programmed computerized machine comprising one or more electronic processors and one or more tangible computer-readable storage media operationally coupled to the one or more processors can be structured and programmed to perform any of the methods described herein. An article comprising a tangible medium that is not a propagating signal can encode computer-readable instructions that, when applied to a computerized machine, program the computerized machine to perform any of the methods described herein.

The disclosure here contemplates implementing the disclosed techniques with a computer or computer system. Even if programmed on a general-purpose computer, such a computer should be considered non-generic and special-purpose once adapted because of the presence of specific programmed computer instructions, which control at least one computer processor and cause it to perform the functions described herein.

References to "a computer" or "computer" (or simply references to computer-programmed operations, computations, or calculations) should be understood to allow for implementation on either a single computer or on multiple computers, such as a system of interconnected devices, or a set of devices using distributed processing techniques. Each computer device, also, may utilize one or more processors.

Alternative instantiations can be accomplished equivalently with dedicated special-purpose computers or dedicated computer appliances, rather than program-adapted general-purpose computing machines. Either way, the specially programmed or structured computer comprises an improved computing machine that accomplishes functions not possible with computers not so constructed or adapted.

The disclosure here refers to equipment or apparatus, such as computer system CS, but the disclosure should be understood to refer equally to the method or process that the apparatus implements, as well as to computer instructions stored in tangible media (that is not a transitory propagating signal) that control a computer to implement such methods or processes.

Examples methods disclosed as processes or techniques can be programmed in computer code as a set of computer instructions. Computer instructions (e.g., computer software, if used in lieu of hardware-wired machines), can be stored in any tangible, non-transient, temporary or permanent computer memory, digital storage, or replaceable media accessible to the computer or encoded in computer hardware, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives.

The data on which the examples operate can be stored in the same or a different computer memory, storage, or media accessible to the computer, of any one or more of the types listed above. Data can be stored in database form of various sorts, and in central or distributed locations.

The examples described herein group various features (including method steps or acts) together for the purpose of streamlining the disclosure. This method of disclosure is not to be interpreted as reflecting an intention that any particular example requires each and every feature recited. Nor is the term "example" intended to refer to a necessary combination of features. The term "example" is not intended to reflect exclusion of features discussed in connection with different examples or with no specific example at all. Nor is any feature to be considered "essential" or "necessary" to any particular or all examples, unless explicitly stated.

Rather, it is contemplated that any particular feature or group of features discussed herein can be isolated from other features, even if disclosed in connection with a particular "example" having additional features. In addition, a feature or group of features from one example can be combined with features discussed elsewhere (unless clearly and necessarily inconsistent). The present disclosure shall be understood, therefore, as disclosing any example having any suitable set of one or more features (i.e., a set of features that are neither incompatible nor mutually exclusive) that appear in (including via incorporation) the present disclosure, including combinations of features that may not be explicitly disclosed in a particular example combination.

For purposes of this disclosure, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

For purposes of this disclosure, words "comprising," "including," "having," and variants thereof, wherever they appear, shall be construed as open-ended terminology, with the same meaning as if the phrase "at least" were appended after each instance thereof.

FIGS. 2A-2E: Cross App Attribution 1st example—copy device identified on next impression or action on original device.

FIGS. 3A-3G: Cross App Attribution 1st example—copy device identified on next impression or action on original device (showing equations).

FIGS. 4A-4K: Cross App Attribution 2nd example—using Removal_Table.

FIGS. 5A-5I: Cross App Attribution 2nd example—using Removal_Table (showing equations)

FIGS. 2A-2E, taken together, illustrate, via spreadsheet data, a first example of how ad impressions and action data are logged by the computer system that implements the present invention for the original device that experienced the ad impression or took the action, and the corresponding copy device. These figures also illustrate how attribution is performed using such logged data. In this first example of cross app attribution, the copy device is identified on the next impression or action that occurs on the original device. More specifically, as soon as the copy device is identified, its ad impression/action data is updated to match the original device so one cannot differentiate between a copy and an original device. The following explanatory text in FIGS. 2A-2E correspond to the respectively identified cells in the spreadsheet.

FIGS. 3A-3G, taken together, illustrate the formulas used in the spreadsheet data of FIGS. 2A-2E.

FIGS. 4A-4K, taken together, illustrate, via spreadsheet data, a second example of how ad impressions and action data are logged by the computer system that implements the present invention for the original device that experienced the ad impression or took the action, and the corresponding copy device. These figures also illustrate how attribution is performed using such logged data. In this second example of cross app attribution, a Removal_Table is used, as described above. The following explanatory text in FIGS. 4A-4K correspond to the footnote numbers in the spreadsheet.

FIGS. 5A-5I, taken together, illustrate the formulas used in the spreadsheet data of FIGS. 4A-4K.

The following general remarks relate to FIGS. 2A-2E and 3A-3G.

While an original and copy devices are linked when a copy device is selected and the original device impression/action is copied to the copy device, CS doesn't know which device is the original and which is the copy until another impression/action takes place on the original device. At this point, it is clear that the other device is the copy device and the number of impressions/actions on the copy device is updated to reflect the impressions/actions on the original device.

The following explanatory remarks relate to the respectively identified cells of FIGS. 2A-2E and 3A-3G.

Cell D-21 device #6 is NOT related to any other device on which an impression was delivered before the action on the device took place.

Cell D-25 device #7 is related to device #4 on a person level. i.e., the action on device #7 follows the impression previously delivered on device #4

Cell 11-25 device #107 is a copy of device #7

Cell 11-15

When an impression takes place on device #1, it becomes clear that the linked device #101 is the copy, and the # of impressions on device #101 is updated from 1 to 2 to mirror the change on original device #1

Cell K-25 device #108 is the NEW copy of device #4, and associated with device #107, which is a copy of device #7, on a person level, similarly to how devices #4 & #7 are related. i.e., copy devices #107 and #108 were selected based on their Person level association, since original devices #4 & #7 are associated on a Person level.

device #108 was selected as the new copy of device #4, since the first copy device of device #4-device #104 could no longer be used as a copy of device #4, since it has no device associated with it on a Person level. As a result, device #104 is deleted from the database.

If a made-up association would have been made between devices #104 and #107 on a Person level, CS could have identified devices #104 and #107 as copy devices, since their association wouldn't have appeared in CS's graph.

By selecting new copy devices for devices #4 & #7 that are also associated on a Person level, CS cannot tell the difference between the original devices and the copy devices.

The following general remarks relate to FIGS. 4A-4K and 5A-5I.

REMOVAL TABLE: As CS cannot differentiate between original devices and copy devices, CS will remove (BUT NOT DELETE) devices per REMOVAL TABLE prior to any attribution calculation.

The following explanatory remarks relate to the respectively identified cells of FIGS. 4A-4K and 5A-5I.

Cell D-18
device #6 is NOT related to any other device on which an impression was delivered before the action on the device took place.

Cell D-22
device #7 is related to device #4 on a person level. i.e., the action on device #7 follows the impression previously delivered on device #4

Cell 11-23
device #115 is a copy of device #4

Cell 11-22
device #113 is a copy of device #4, which is related to device #7. Copied in terms of everything that matters in terms of attribution Cell K-22
device #114 is a copy of device #7 and related to device #113 on a person level, similarly to how devices #4 & #7 are related. i.e., devices #113 and #114 were selected based on their Person association level.

Cell K-23
device #116 is a copy of device #7 and related to device #115 on a person level, similarly to how devices #4 & #7 are related. i.e., devices #115 and #116 were selected based on their Person association level.

copy device #113, which was created as a copy of device #4 before, was NOT edited to increase its number of impressions from 1 to 2, like device #4, since IIQ does not know that device #113 is a copy. If IIQ will add another impression (made up) to device #113 and it is a real device (not a copy) then when device #113 will receive a real impression, the attribution calculation will be skewed.

Cell S-12
As we don't know which device was created as a copy of device #1 with 1 impression, we will simply remove, before attribution calculation, a device like device #1 with 1 impression and 0 actions.

Cell S-15
As we don't know which device was created as a copy of device #2 with 1 impression, we will simply remove, before attribution calculation, a device like device #2 with 1 impression and 0 actions.

Cell S-16
As we don't know which device was created as a copy of device #1 with 2 impressions, we will simply remove, before attribution calculation, a device like device #1 with 2 impressions and 0 actions.

Cell S-19
As we don't know which device was created as a copy of device #2 with 2 impressions, we will simply remove, before attribution calculation, a device like device #2 with 2 impression and 0 actions.

Cell S-20
As we don't know which device was created as a copy of device #3 with 1 impression, we will simply remove, before attribution calculation, a device like device #3 with 1 impression and 0 actions.

Cell S-21
As we don't know which device was created as a copy of device #2 with 2 impressions and 1 action, we will simply remove, before attribution calculation, a device like device #2 with 2 impressions and 1 action.

Cell S-22
As we don't know which device was created as a copy of device #4, we will simply remove, before attribution calculation, a device like device #4 with 1 impression and 0 actions.

Cell S-23
remove a device like device #4 before the added 2nd impression (i.e., a device with 1 impression & 0 actions) and a device related to it on a Person level with 0 impressions and 1 action (i.e., like device #7)

Additional Explanations of FIGS. 4A-4K and 5A-5I

DEVICE # EXAMPLE OF DEVICES REMOVED PER REMOVAL TABLE: 101, 102, 104, 107, 5, 110, 106, 113, 114

Since CS cannot differentiate between original and copied devices, the devices removed from the calculation include both original and copied devices.

When a copy device is created and the original and copy devices are added to the database, since they are the last to be added according to time stamp, to make sure that the original could not be identified according to timestamp (being before the copy), sometimes the copy will be given an earlier time stamp and sometimes a later timestamp using a random function.

When receiving an original device, if it has many attributes (female, age 30-35, with 3 kids at home, living in Livingston N.J., love playing casual online games, etc.), if the original device has many profile attributes, CS could either make up similar attributes and attach to a copy device but then risk being able to identify the copy since CS could use a third-party data to validate some of those attributes (for example, CS attached a female made-up attribute to a copied device but checking it against a third-party database shows the device is used by a male so clearly this is a copy device), OR the client could provide the device along with attributes type numbers that are not known to CS. For example, the female is attribute #205, age 30-35 is attribute 752, etc. CS will then create a copy device with same attribute numbers without being able to identify which device is the original.

END OF EXPLANATORY REMARKS

III. EXAMPLES OF EMBODIMENTS OF THE PRESENT INVENTION

Figure 6A:
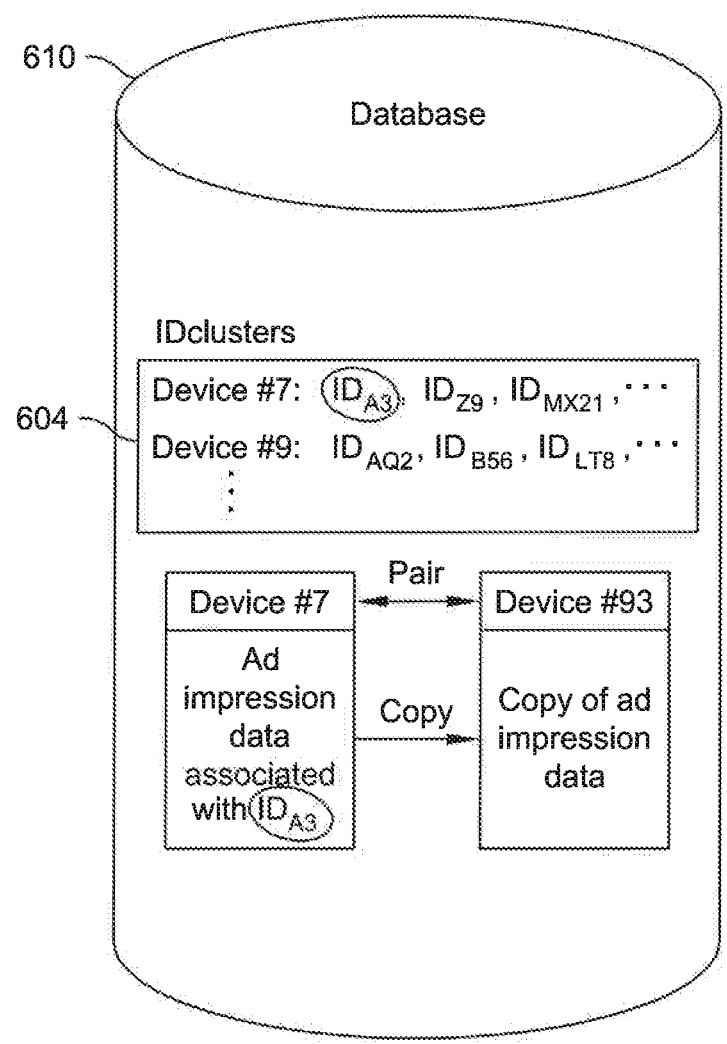
FIGS. 6A-6C, taken together, illustrate one example of database elements in a system for implementing embodiments of the present invention.
Figure 6B:
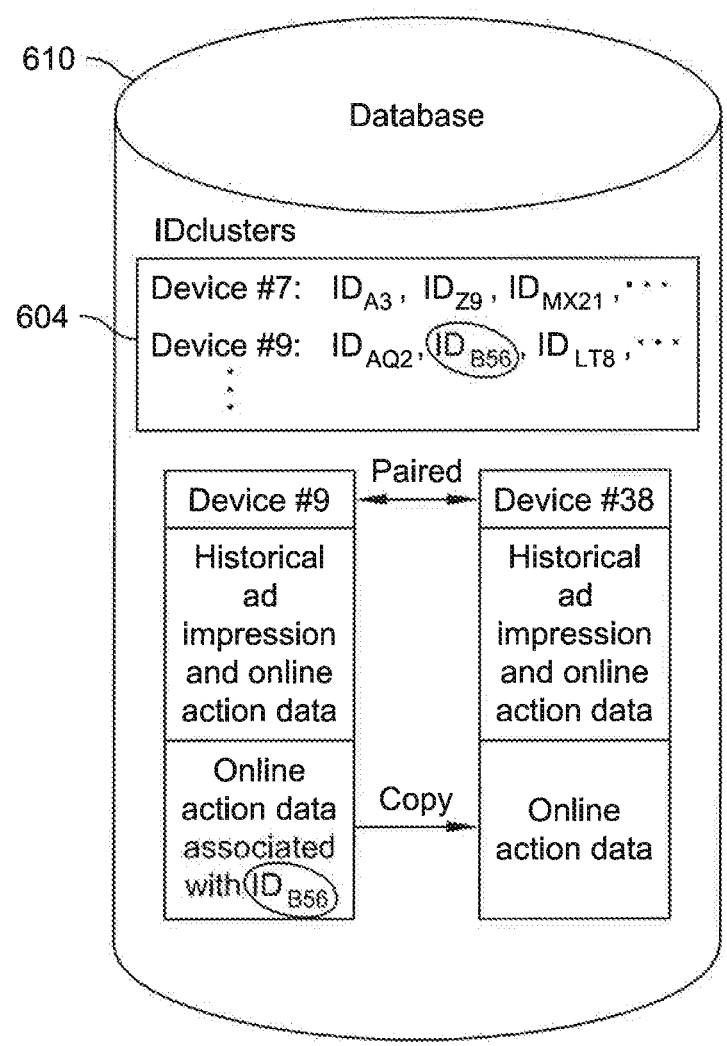
Figure 6C:
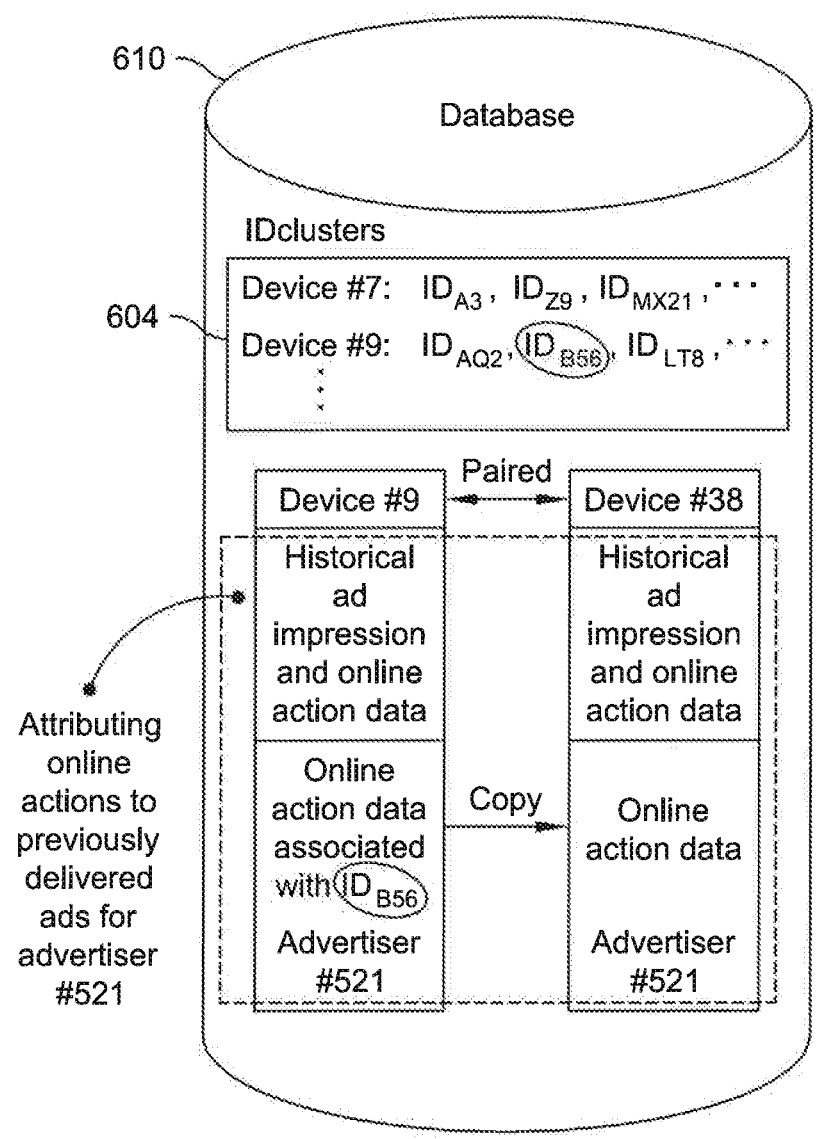

FIGS. 6A-6C, taken together, illustrate one example of database 610 elements in a system for implementing embodiments of the present invention. FIG. 7 illustrates a flowchart 700 for implementing such embodiments. Referring to FIGS. 6A-6C and 7, a computer-implemented system and method are provided for attributing online actions to previously delivered electronic advertisements on a plurality of devices using device identifier clusters (IDclusters) 604.

Each IDcluster includes one or more identifiers. Each IDcluster is typically associated with a function on a device, and each device has device characteristics. Each IDcluster further possibly includes a deviceID.

Referring to FIG. 6A, a plurality of devices (not shown) receive ads and take online actions, and thus are associated with ad impression data and online action data.

Consider an example of ad impression data associated with a device having device $ID_{A3}$, and online action data associated with a device having device $ID_{B56}$. In this example, the ad impression data associated with device $ID_{A3}$ is for advertiser #974, and the online action data associated with device $ID_{B56}$ is for advertiser #521.

IIQ's computer system uses $ID_{A3}$ from a device's ad impression data to identify that $ID_{A3}$ is part of a device ID cluster of a device with deviceID #7. The computer system checks if device #7 received an ad impression or took an online action prior to receiving the ad associated with $ID_{A3}$. Assuming that no previous ad impression or online action occurred on device #7, the following actions occur:
   i. Select a copy device that has similar characteristics to device #7. Here, the selected copy device has deviceID #93.
   ii. Pair device #93 with device #7.
   iii. Add a copy of the received ad impression data to device #93.

Referring to FIG. 6B, device #9 has been previously paired with device #38. FIG. 6B illustrates how the online action data associated with device $ID_{B56}$ is handled.

IIQ's computer system uses $ID_{B56}$ from a device's online action data to identify that $ID_{B56}$ is part of a device ID cluster of a device with deviceID #9. The computer system checks if device #9 received an ad impression or took an online action prior to taking the online action associated with $ID_{B56}$. If so, a copy of the received online action data is added to the previously paired copy device. That is, the received online action data associated with $ID_{B56}$ and device #9 is copied to device #38 as the device's online action data.

Referring to FIG. 6C, this figure is similar to FIG. 6B, except that it illustrates advertiser #521 in the online action data. FIG. 6C illustrates the attribution process. For at least a given advertiser ID, such as advertiser #521, online actions are attributed to previously delivered ads by using data in the computer system to identify which online actions were preceded by delivered ads within the same function on a device, or within the same device. As shown in FIG. 6C, the attribution determination takes into account both the original device and the paired copy device. When data from both the original device and the paired copy device are used in this example, the result is divided by two. Alternatively, only one of either the original device or the paired copy device is used, and the result is not divided by two.

FIG. 8 shows examples of device identifiers that can be included in a device ID cluster, such as the following:
   1. an application user identifier (AppUID), also referred to in the art as an "app UID"
   2. a site visitor identifier (SiteVID)
   3. an IP address
   4. a combination of an IP address and a user agent IPv4 uses a 32-bit format, and thus is constrained in providing enough unique addresses to identify every device. In many cases, an IPv4 address will be shared by several devices to access the web. For example, household online devices via a household LAN use a cable modem assigned IPv4 address to access the web. Accordingly, when using IPv4, a combination of an IPv4 address and a user agent may uniquely identify a device, if only one device of such type is accessing the web via the given IPv4 address. IPv6 uses a 128-bit address format and provides sufficient unique addresses to allow for uniquely identifying a device solely by using the IPv6 address.

Each device ID cluster may have only one type of a device identifier, or it may have a plurality of different types of device identifiers. As is well-known in the art, website visitor identification software typically generates unique site visitor identifiers. As is also well-known in the art, each instance of an application (app) download is typically assigned a unique identifier.

In one embodiment, the system and method operates as follows:

STEP 702: Computer system receives at least the following data:
   1. Ad impression data. At least the following data is received for each ad impression:
      a. an ad identifier,
      b. a device identifier associated with a device that the ad impression was delivered to, and
      c. an advertiser ID
   2. Online action data. At least the following data is received for each online action:
      a. an online action identifier,
      b. a device identifier associated with a device that the online action took place on, and
      c. advertiser ID The computer system is equivalent to the "CS" (computer system) referred to above.

The online action identifier is equivalent to the "attributes IDs" or the "numbers characterizing the action," or the "action type of ID" referred to above.

In one embodiment, the ad impression data is received from a DSP (Demand Side Platform) delivering ads on behalf of the advertiser or an ad server delivering the ads or via an incorporated 1×1 pixel redirect to the computer system in the served ad creative or via a daily or hourly (or other desired time window) log file that includes the above information. The online action data is received from the advertiser or a vendor used by the advertiser such as a media measurement firm. The online action could be reported by redirecting the device to the computer system during the time of the online action or by sending a daily or hourly or other desired time window log file that includes the online actions within that time window to the computer system. However, other mechanisms may be used to obtain the ad impression data and the online action data. DSP examples include TheTradeDesk and MediaMath. Ad servers are well-known in the art, and any suitable ad servers may be used. Examples of companies that provide ad server services include DoubleClick For Publisher (DFP ad server), OpenX® platform, and Smart Ad Server. Media measurement firm examples are Appsflyer and Singular.

STEP 704: Store the received ad impression data and the online action data in database 610 of the computer system. Certain parts of the data, in some implementations, may only need to be stored transiently, such as the identifiers associated with the device. Once it is used to identify the appropriate device ID cluster, it can then be discarded. In some other implementations, the device identifier is kept, and the copy device is assigned a made-up device identifier that is stored in association with the copy device. Other mechanisms to store the data may be used as well. In some implementations, other parts of the data will be persistently stored for use in attribution. The database 610 is one embodiment of the AdTrail data set described above. The database 610 may take any suitable form known in the database arts, and may also be distributed among plural databases at the same or different locations. The database 610 may be physically located with the computer system, or may be remotely located from, but associated with, the computer system.

STEP 706: For each device identifier received from the ad impression data or the online action data, the computer system identifies a device ID cluster from the device ID clusters that includes the received device identifier, thereby identifying the device that received the ad impression or took the online action.

STEP 708: Electronically link in the database 610, by the computer system, the received ad impression data or online action data with the device associated with the device ID cluster identified in Step 706.

STEP 710: Determine, by the computer system for each received ad impression or online action, whether an ad impression or online action previously occurred either (i) on the same device within the same function that is associated with the identified device ID cluster, or (ii) within another function on the same device that is associated with the identified device ID cluster. Here, a function refers to an app or a browser or software (e.g., native email software). Thus, the previous occurrence may have occurred on the same device within the same app or browser or software, or the previous occurrence may have occurred within another application or another browser or another software on the same device. The following Table 1 shows some of the different permutations that are possible for each received ad impression or online action:

TABLE 1

| Current | Previous |
|---|---|
| ad impression | ad impression |
| ad impression | online action |
| online action | ad impression |
| online action | online action |

STEP 712: The computer system takes one of the following actions as a result of the determination in Step 710:

1. When no previous ad impression or online action previously occurred on the same device, perform the following steps:
   a. Select a copy device with similar characteristics to the device associated with the identified device ID cluster. The copy devices are real devices, but they are not the devices which are actually receiving the ad impressions or taking the online actions referenced above. To be clear, since the copy devices are real devices, the copy devices may also receive ad impressions and/or take online actions. Likewise, copy devices may also have their own respective device ID clusters. Since the computer system selects a copy device with similar characteristics to the device associated with the identified device ID cluster, the computer system receives data regarding the characteristics of many devices, including the copy devices. Conventional techniques are known for obtaining such characteristics of devices. As discussed above, the copy device may be randomly selected in some implementations. That is, once a pool of candidate copy devices are identified, one of the copy devices is randomly selected from the pool.
   b. Electronically pair the device associated with the identified device ID cluster with the selected copy device;
   c. Add in the database to the selected copy device a copy of the received ad impression data or online action data received for the device associated with the identified device ID cluster; or 2. When a previous ad impression or online action previously occurred on the same device, add a copy of the received ad impression data or online action data to the previously paired copy device.

STEP 714: Repeat Steps 702-712 as additional ad impressions and online actions occur over time on a plurality of the devices. (This step is inherently understood, but is explicitly noted for clarity.)

STEP 716: Attribute, by the computer system, online actions to previously delivered electronic advertisements by using data in the computer system to identify for at least a given advertiser ID which online actions were preceded by delivered ad impressions within the same function on a device, or within the same device.

IV. FURTHER CONSIDERATIONS

In one embodiment of the present invention, mobile phones are used to track brick and mortar store visits using the GPS/location coordinates reported by mobile apps or websites on the mobile phones. In addition, any physical location visited may be mapped and tracked. The process described above thus may attribute a brick and mortar store visit or any physical location visit, i.e. an action, to a previously viewed online ad within a site or app.

In yet another example, the viewing of a billboard by a person could be identified since the person's mobile phone GPS coordinates will show the phone owner as having stood in front of the billboard. This may be recorded as an ad impression. Any physical location visit could be recorded as an ad impression if relevant. For example, a visit to an online brand's brick and mortar store intended to provide prospects with hands-on experience of the brand's products (such as an eyeglasses store) could be recorded as an ad impression, especially when the brand is looking to convert the visitors to its brick and mortar store to buyers on its website or app. In this example, the process described above may attribute an online action to a previous visit of a physical location.

The brick and mortar store visit could, for example, be reported as an action (see "Attribute IDs" discussed above). For example, the GPS/location coordinates may be given, or an ID representing a brick and mortar store at a specific geolocation may be given. The app name may be the app that generated the GPS/location coordinates, since the app details are important to correlate the location data originating from the mobile app with the online ad by identifying that the online ad and the 'action' took place on the same device or associated devices. While the 'action' that is of interest to the advertiser is the visit of the brick and mortar store, and not the weather app, for example, that provided the GPS/location data, identifying the store visit, the weather app name, user ID, IP address, and user agent could help in identifying the device ID cluster, which is important to find related online ads on same or associated device.

The term "GPS/location data" is being used, and not just "GPS" since mobile phone reported location data in many cases is not the result of a GPS but another geolocation determination technique used by the phone operating system, for example when the device is indoors and GPS is typically not available.

In another example, the ad may be an outdoor billboard ad, the viewing of which is identified using geolocation coordinates covering the viewing area of the billboard. If a mobile phone visits coordinates within that area, they are assumed to have viewed the billboard ad. In this example, the ad impression could be described using the mobile app or mobile site that contributed the geolocation coordinates identifying the billboard. Additional information about the billboard might be provided, for example, via the ad impression Attribute IDs or Creative ID discussed above.

To maximize the benefit of attributing actions to previously viewed ads or previously taken actions, the computer system can be given, for any ad impression or action reported to it, any data field that the computer system user would like to see as part of the attribution analysis. For example, a brick and mortar store ID could be reported as a data field attached to an impression or action. A billboard ID could be another data field example.

Further embodiments of the present invention may correlate the billboard ad impression with an action taking place after viewing the billboard such as an online action of visiting the billboard advertiser website or mobile app, for example, or an offline action of visiting the billboard advertiser brick and mortar store, as reflected in geo coordinates reported by a mobile phone.

Embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method for attributing online actions to previously delivered electronic advertisements on a plurality of devices using a plurality of device identifier (ID) clusters, each device ID cluster including one or more identifiers, and each device ID cluster is associated with a function on a device that has device characteristics, the method comprising:
   (a) receiving, by a computer system:
      (i) ad impression data including, for each ad impression:
         (A) an ad identifier,
         (B) a device identifier associated with a device that the ad impression was delivered to, and
         (C) an advertiser ID, and
      (ii) online action data including, for each online action:
         (A) an online action identifier,
         (B) a device identifier associated with a device that the online action took place on, and
         (C) an advertiser ID, and;
   (b) storing the ad impression data and the online action data in a database of the computer system;
   (c) for each device identifier received from the ad impression data or the online action data, using the computer system to identify a device ID cluster from the plurality of device ID clusters that includes the received device identifier, thereby identifying the device that received the ad impression or took the online action;
   (d) electronically linking in the database, by the computer system, the received ad impression data or online action data with the device associated with the device ID cluster identified in step (c);
   (e) determining, by the computer system, for each received ad impression or online action, whether an ad impression or online action previously occurred:
      (i) on the same device within the same function that is associated with the identified device ID cluster, or
      (ii) within another function on the same device that is associated with the identified device ID cluster;
   (f) the computer system taking one of the following actions as a result of the determination in step (e):
      (i) when no previous ad impression or online action previously occurred on the same device:
         (A) select a copy device with similar device characteristics to the device characteristics of the device associated with the identified device ID cluster,
         (B) electronically pair the device associated with the identified device ID cluster with the selected copy device, and
         (C) add in the database to the selected copy device a copy of the received ad impression data or online action data received for the device associated with the identified device ID cluster; or
      (ii) when a previous ad impression or online action previously occurred on the same device, add a copy of the received ad impression data or online action data to the previously paired copy device that was selected as a result of having similar device characteristics to the device associated with the identified device ID cluster; and
   (g) attributing, by the computer system, online actions to previously delivered electronic advertisements by using data in the computer system to identify for at least a given advertiser ID which online actions were preceded by delivered ad impressions within the same function on a device, or within the same device.

2. The method of claim 1 wherein step (g) further comprises performing, by the computer system using data from the computer system's database, for at least a given advertiser ID, an attribution ratio calculation using a total number of online actions recorded in the database divided by the total number of ad impressions recorded in the database.

3. The method of claim 2 wherein the ad impressions and the online actions included in the attribution ratio calculation are limited to devices where the device ID cluster was identified in step (c) and their paired copy devices.

4. The method of claim 3 wherein the ad impressions and the online actions included in the attribution ratio calculation are further limited to one device out of each pair of devices.

5. The method of claim 1 wherein the received device identifiers associated with the ad impressions and the online actions are only temporarily stored in the database, and are deleted after the device ID cluster is identified in step (c).

6. The method of claim 1 wherein the similar device characteristics include the same user agent.

7. The method of claim 1 wherein the copy device is randomly selected from an identified pool of candidate copy devices which have similar device characteristics to the device characteristics of the device associated with the identified device ID cluster.

8. The method of claim 1 wherein the device identifiers include one or more of:
   (i) application user identifiers,
   (ii) site visitor identifiers,
   (iii) IP addresses, or
   (iv) combinations of IP addresses and user agents.

9. The method of claim 1 wherein step (e)(ii) is performed using a device graph.

10. A computer program product for attributing online actions to previously delivered electronic advertisements on a plurality of devices using a plurality of device identifier (ID) clusters, each device ID cluster including one or more identifiers, and each device ID cluster is associated with a function on a device that has device characteristics, the computer program product comprising a non-transitory computer readable storage medium tangibly embodying computer-executable program instructions thereon that, when executed, causes a computer system that includes one or more computer devices to:
(a) receive:
 (i) ad impression data including, for each ad impression:
  (A) an ad identifier,
  (B) a device identifier associated with a device that the ad impression was delivered to, and
  (C) an advertiser ID, and
 (ii) online action data including, for each online action:
  (A) an online action identifier,
  (B) a device identifier associated with a device that the online action took place on, and
  (C) an advertiser ID, and;
(b) store the ad impression data and the online action data in a database of the computer system;
(c) for each device identifier received from the ad impression data or the online action data, identify a device ID cluster from the plurality of device ID clusters that includes the received device identifier, thereby identifying the device that received the ad impression or took the online action;
(d) electronically link in the database the received ad impression data or online action data with the device associated with the device ID cluster identified in step (c);
(e) determine for each received ad impression or online action, whether an ad impression or online action previously occurred:
 (i) on the same device within the same function that is associated with the identified device ID cluster, or
 (ii) within another function on the same device that is associated with the identified device ID cluster;
(f) take one of the following actions as a result of the determination in step (e):
 (i) when no previous ad impression or online action previously occurred on the same device:
  (A) select a copy device with similar device characteristics to the device characteristics of the device associated with the identified device ID cluster,
  (B) electronically pair the device associated with the identified device ID cluster with the selected copy device, and
  (C) add in the database to the selected copy device a copy of the received ad impression data or online action data received for the device associated with the identified device ID cluster; or
 (ii) when a previous ad impression or online action previously occurred on the same device, add a copy of the received ad impression data or online action data to the previously paired copy device that was selected as a result of having similar device characteristics to the device associated with the identified device ID cluster; and
(g) attribute online actions to previously delivered electronic advertisements by using data in the computer system to identify for at least a given advertiser ID which online actions were preceded by delivered ad impressions within the same function on a device, or within the same device.

11. The computer program product of claim 10 wherein step (g) further comprises using data from the database in the computer system for at least a given advertiser ID to perform an attribution ratio calculation using a total number of online actions recorded in the database divided by the total number of ad impressions recorded in the database.

12. The computer program product of claim 11 wherein the ad impressions and the online actions included in the attribution ratio calculation are limited to devices where the device ID cluster was identified in step (c) and their paired copy devices.

13. The computer program product of claim 12 wherein the ad impressions and the online actions included in the attribution ratio calculation are further limited to one device out of each pair of devices.

14. The computer program product of claim 10 wherein the received device identifiers associated with the ad impressions and the online actions are only temporarily stored in the database, and are deleted after the device ID cluster is identified in step (c).

15. The computer program product of claim 10 wherein the similar device characteristics include the same user agent.

16. The computer program product of claim 10 wherein the copy device is randomly selected from an identified pool of candidate copy devices which have similar device characteristics to the device characteristics of the device associated with the identified device ID cluster.

17. The computer program product of claim 10 wherein the device identifiers include one or more of:
 (i) application user identifiers,
 (ii) site visitor identifiers,
 (iii) IP addresses, or
 (iv) combinations of IP addresses and user agents.

18. The computer program product of claim 10 wherein step (e)(ii) is performed using a device graph.

19. A computer-implemented system for attributing online actions to previously delivered electronic advertisements on a plurality of devices using a plurality of device identifier (ID) clusters, each device ID cluster including one or more identifiers, and each device ID cluster is associated with a function on a device that has device characteristics, the system comprising:
(a) a computer system configured to receive over time on a plurality of the devices:
 (i) ad impression data including, for each ad impression:
  (A) an ad identifier,
  (B) a device identifier associated with a device that the ad impression was delivered to, and
  (C) an advertiser ID, and
 (ii) online action data including, for each online action:
  (A) an online action identifier,
  (B) a device identifier associated with a device that the online action took place on, and
  (C) an advertiser ID; and
(b) a database of the computer system configured to store the ad impression data and the online action data therein,
wherein the computer system is further configured to:
 (i) for each device identifier received from the ad impression data or the online action data, identify a device ID cluster from the plurality of device ID clusters that includes the received device identifier, thereby identifying the device that received the ad impression or took the online action;

(ii) electronically link in the database the received ad impression data or online action data with the device associated with the identified device ID cluster;

(iii) determine for each received ad impression or online action, whether an ad impression or online action previously occurred:
 (A) on the same device within the same function that is associated with the identified device ID cluster, or
 (B) within another function on the same device that is associated with the identified device ID cluster;

(iv) take one of the following actions as a result of the determination:
 (A) when no previous ad impression or online action previously occurred on the same device:
  (I) select a copy device with similar device characteristics to the device characteristics of the device associated with the identified device ID cluster,
  (II) electronically pair the device associated with the identified device ID cluster with the selected copy device, and
  (III) add in the database to the selected copy device a copy of the received ad impression data or online action data received for the device associated with the identified device ID cluster; or
 (B) when a previous ad impression or online action previously occurred on the same device, add a copy of the received ad impression data or online action data to the previously paired copy device that was selected as a result of having similar device characteristics to the device associated with the identified device ID cluster; and (v) attribute, by the computer system, online actions to previously delivered electronic advertisements by using data in the computer system to identify for at least a given advertiser ID which online actions were preceded by delivered ad impressions within the same function on a device, or within the same device.

20. The system of claim 19 wherein the computer system is further configured to perform, for at least a given advertiser ID, an attribution ratio calculation using a total number of online actions recorded in the database divided by the total number of ad impressions recorded in the database.

21. The system of claim 20 wherein the ad impressions and the online actions included in the attribution ratio calculation are limited to devices where the device ID cluster was identified, and their paired copy devices.

22. The system of claim 21 wherein the ad impressions and the online actions included in the attribution ratio calculation are further limited to one device out of each pair of devices.

23. The system of claim 19 wherein the received device identifiers associated with the ad impressions and the online actions are only temporarily stored in the database, and are deleted after the device ID cluster is identified.

24. The system of claim 19 wherein the similar device characteristics include the same user agent.

25. The system of claim 19 wherein the copy device is randomly selected from an identified pool of candidate copy devices which have similar device characteristics to the device characteristics of the device associated with the identified device ID cluster.

26. The system of claim 19 wherein the device identifiers include one or more of:
 (i) application user identifiers,
 (ii) site visitor identifiers,
 (iii) IP addresses, or
 (iv) combinations of IP addresses and user agents.

27. The system of claim 19 wherein the computer system is further configured to use a device graph to determine for each received ad impression or online action, whether an ad impression or online action previously occurred within another function on the same device that is associated with the identified device ID cluster.

* * * * *